United States Patent
Toyama et al.

[11] Patent Number: 6,031,668
[45] Date of Patent: Feb. 29, 2000

[54] OPTICAL IMAGING SYSTEM

[75] Inventors: Minoru Toyama; Shigeo Kittaka; Atsushi Akiba, all of Osaka, Japan

[73] Assignee: Nippon Sheet Glass Co., Ltd., Osaka, Japan

[21] Appl. No.: 09/212,076

[22] Filed: Dec. 15, 1998

[30] Foreign Application Priority Data

Dec. 24, 1997 [JP] Japan ..................................... 9-355079
Feb. 13, 1998 [JP] Japan ..................................... 10-030706

[51] Int. Cl.[7] .................................. G02B 3/00; G02B 6/02
[52] U.S. Cl. ......................... 359/654; 359/652; 385/124
[58] Field of Search .................................. 359/652, 653, 359/654; 385/124

[56] References Cited

U.S. PATENT DOCUMENTS

| 4,349,248 | 9/1982 | Rees | 350/413 |
| 5,038,027 | 8/1991 | Ioka | 250/208.1 |
| 5,959,783 | 9/1999 | Kittaka et al. | 359/654 |

FOREIGN PATENT DOCUMENTS

| 0 596 664 A1 | 5/1994 | European Pat. Off. . |
| 0 887 664 A2 | 12/1998 | European Pat. Off. . |
| 0 898 181 A2 | 2/1999 | European Pat. Off. . |

OTHER PUBLICATIONS

European Search Report, Aug. 16, 1999, 3 pages.

*Primary Examiner*—Scott J. Sugarman
*Assistant Examiner*—David N. Spector
*Attorney, Agent, or Firm*—Rosenthal & Osha L.L.P.

[57] ABSTRACT

An optical imaging system includes a rod lens array, whose individual lenses have a refractive index distribution optimized for high resolving power, which can be expressed by $$n(r)^2 = n_0^2 \cdot \{1 - (g \cdot r)^2 + h_4 \cdot (g \cdot r)^4 + h_6 \cdot (g \cdot r)^6\} \quad \text{(Eq. 93)}$$

wherein r is a radial distance from an optical axis of said rod lenses, $n_0$ is the refractive index at the optical axis of said rod lenses, and g, $h_4$ and $h_6$ are coefficients of the refractive index distribution. The refractive index distribution coefficients $h_4$ and $h_6$ are defined, using parameters a, b, c, and d, as $$c - d \leq h_4 \leq c + d \quad \text{(Eq. 94)}$$

$$\{(h_4 - c)/d\}^2 + [\{h_6 - (a \cdot h_4 + b)\}/e]^2 \leq 1. \quad \text{(Eq. 95)}$$

22 Claims, 27 Drawing Sheets

OPTICAL IMAGING SYSTEM

FIELD OF THE INVENTION

This invention relates to an optical imaging system used in an image transmission portion of, for example, a facsimile device or a copier. More particularly, the invention relates to an optical imaging system comprising a plurality of rod lenses arranged in an array.

BACKGROUND OF THE INVENTION

Optical imaging systems comprising a plurality of rod lenses with a refractive index distribution in a radial direction that are arranged in an array are widely used in the image transmission portion of, for example, facsimile devices or copiers.

The refractive index distribution of such rod lenses can be expressed, for example by $$n(r)^2 = n_0^2 \cdot \{1-(g \cdot r)^2 + h_4 \cdot (g \cdot r)^4 + h_6 \cdot (g \cdot r)^6\} \quad \text{(Eq. 25)}$$

wherein r is the radial distance from the optical axis of the rod lens, n(r) is the refractive index at the radial distance r from the optical axis of the rod lenses, $n_0$ is the refractive index at the optical axis of the rod lens (center a refractive index), and g, $h_4$ and $h_6$ are coefficients for the refractive index distribution.

Conventionally, the resolving power demanded from such a rod lens array called for an MTF (modulation transfer function) of at least 60% when a pattern of 4–6 line-pairs/mm (ca. 200 dpi–300 dpi) was imaged. To meet this demand, it was sufficient to control only g or both g and $h_4$ of the refractive index distribution coefficients for the rod lens.

Recently, however, with the steadily rising quality of printers and scanners, there is a demand for rod lens arrays with a resolving power of at least 12 line-pairs/mm (ca. 600 dpi). To realize a rod lens array having such a high resolving power, all refractive index distribution coefficients including $h_6$ have to be controlled precisely during design and fabrication of the rod lens array.

It is possible to determine the optimum refractive index distribution coefficients for correcting the spherical aberration on the optical axis of a single rod lens. However, in the case of a plurality of rod lenses arranged in an array, not only spherical aberration, image curvature and astigmatism of the individual lenses, but also the overlapping of images from neighboring lenses may change the resolving power.

The optimum refractive index distribution changes also with the brightness of the rod lenses. For example, in the case of bright rod lenses with a large aperture angle, the refractive index distribution coefficients for a small axial spherical aberration are very different from the refractive index distribution coefficients for a small image curvature. The best resolving power can be attained by striking a balance between the two.

The overlapping degree is given by $$m = X_0/2r_0 \quad \text{(Eq. 26)}$$

wherein $r_0$ is the effective radius of the lens portion, that is the radius of the portion of the rod lenses that functions as a lens, and $X_0$ is the image radius that a single rod lens projects onto the image plane (field of view). Here, $X_0$ is defined as $X_0 = -r_0/\cos(Z_0\pi/P)$, wherein $Z_0$ is the rod lens length and P is the one-pitch length of the rod lens. Even if the rod lenses have the same refractive index distribution, the overlapping degree is dependent upon the length of the lenses, and thus changes the resolving power.

Consequently, to attain a high resolving power, the refractive index distribution coefficients have to be determined separately in accordance with at least the numerical angle and the overlapping degree of each rod lens.

The present invention has been developed with consideration of these facts. The purpose of the present invention is to provide an optical imaging system comprising a plurality of rod lenses arranged in an array, and having a refractive index distribution that is ideal for attaining a high resolving power.

SUMMARY OF THE INVENTION

In order to achieve these purposes, a first configuration of an optical imaging system for focusing light from a manuscript (i.e. object) plane onto an image plane in accordance with the present invention comprises a rod lens array having a plurality of rod lenses with a refractive index distribution in a radial direction that are arranged in one row so that their optical axes are parallel. The refractive index distribution of the rod lenses can be expressed by $$n(r)^2 = n_0^2 \cdot \{1-(g \cdot r)^2 + h_4 \cdot (g \cdot r)^4 + h_6 \cdot (g \cdot r)^6\} \quad \text{(Eq. 27)}$$

wherein r is a radial distance from an optical axis of the rod lenses, $n_0$ is the refractive index on the optical axis of the rod lenses, and g, $h_4$ and $h_6$ are coefficients of the refractive index distribution. Constants a, b, c, d, and e are given by $$a = -10^{LA}$$

$$LA = 3.632 - 24.54(g \cdot r_0) + 102.4(g \cdot r_0)^2 - 172.8(g \cdot r_0)^3 \quad \text{(Eq. 28)}$$

$$b = 10^{LB}$$

$$LB = 3.729 - 28.78(g \cdot r_0) + 131.4(g \cdot r_0)^2 - 238.6(g \cdot r_0)^3 \quad \text{(Eq. 29)}$$

$$c = 1 \quad \text{(Eq. 30)}$$

$$d = 10^{LD} \cdot (1.789 - 0.6063 \, m + 0.06225 \, m^2)$$

$$LD = 2.216 - 18.01(g \cdot r_0) + 53.51(g \cdot r_0)^2 - 73.59(g \cdot r_0)^3 \quad \text{(Eq. 31)}$$

$$e = 10^{LE} \cdot 10^{LE2}$$

$$LE = 5.327 - 47.81(g \cdot r_0) + 197.7(g \cdot r_0)^2 - 334.2(g \cdot r_0)^3$$

$$LE2 = 0.2460 - 0.1669 \, m + 0.00056 \, m^2 \quad \text{(Eq. 32)}$$

wherein $r_0$ is a radius of a portion of the rod lenses functioning as a lens, and m is an overlapping degree. The refractive index distribution coefficients $h_4$ and $h_6$ are in ranges defined by $$c - d \leq h_4 \leq c + d \quad \text{(Eq. 33)}$$

$$\{(h_4-c)/d\}^2 + [\{h_6-(a \cdot h_4+b)\}/e]^2 \leq 1. \quad \text{(Eq. 34)}$$

According to this first configuration, an optical imaging system can be realized, which comprises a plurality of rod lenses, arranged in an array, that have a suitable refractive index distribution for attaining a high resolving power of at least 12 line-pairs/mm (ca. 600 dpi) if the outer diameter of the lenses is 0.6 mm.

In the first configuration of the optical imaging system, it is preferable that the refractive distribution coefficients $h_4$ and $h_6$ are in ranges defined by $$c - d/2 \leq h_4 \leq c + d/2 \quad \text{(Eq. 35)}$$

$$\{2(h_4-c)/d\}^2 + [2\{h_6-(a \cdot h_4+b)\}/e]^2 \leq 1. \quad \text{(Eq. 36)}$$

According to this configuration, an optical imaging system with a more preferable refractive index distribution can be realized.

In the first configuration of the optical imaging system, it is preferable that the refractive index $n_0$ at the optical axis of the rod lenses is in a range of $1.4 \leq n_0 \leq 1.8$.

In the first configuration of the optical imaging system, it is preferable that the product $g \cdot r_0$ of the refractive index distribution coefficient g and the radius $r_0$ of the portion of the rod lenses functioning as a lens is in a range of $0.04 \leq g \cdot r_0 \leq 0.27$. If $g \cdot r_0$ is smaller than 0.04, the image becomes too dark and the time for scanning etc. becomes long. If $g \cdot r_0$ is larger than 0.27, the influence of the image curvature and the astigmatism becomes too large and the resolving power decreases.

In the first configuration of the optical imaging system, it is preferable that the refractive index distribution of the rod lenses is given by $$n(r)^2 = n_0^2 \cdot \{1 - (g \cdot r)^2 + f(r)\} \qquad \text{(Eq. 37)}$$

wherein $f(r)$ is a function of r that satisfies $$h_{4A} \cdot (g \cdot r)^4 + h_{6A} \cdot (g \cdot r)^6 \leq f(r) \leq h_{4B} \cdot (g \cdot r)^4 + h_{6B} \cdot (g \cdot r)^6 \qquad \text{(Eq. 38)}$$

for r in a range of $0 \leq r \leq r_0$ ($r_0$: radius of the portion of the rod lenses functioning as a lens) for two groups of refractive index distribution coefficients ($n_0$, g, $h_{4A}$, $h_{6A}$) and ($n_0$, g, $h_{4B}$, $h_{6B}$) that are in the ranges defined by Eq. 28–Eq. 34.

In the first configuration of the optical imaging system, it is preferable that the radius $r_0$ of the portion of the rod lenses functioning as a lens is in a range of $0.05 \text{ mm} \leq r_0 \leq 0.60 \text{ mm}$. According to this configuration, production and assembly of the rod lenses become easy, and the aberrations of the rod lens array can be kept small.

Since the refractive index distribution at the peripheral portion of the rod lenses can differ considerably from the designed value, this portion often cannot be used for the lens. Also, sometimes the lenses comprise a light-absorbing layer to prevent stray light that may be due to total reflection at the lens side surface. Moreover, depending on the conditions for assembling the rod lens array, sometimes the rod lenses are arranged with a certain distance between each other. Therefore, it is preferable that in the first configuration of the optical imaging system, $r_0/R$ is in the range $0.5 \leq r_0/R \leq 1.0$, wherein $r_0$ is the radius of the portion of the rod lenses functioning as a lens and 2R is a distance between the optical axis of two neighboring rod lenses.

In the first configuration of the optical imaging system, it is preferable that $Z_0/P$ is in the range $0.5 < Z_0/P < 1.0$, wherein $Z_0$ is a length of a rod lens and $P = 2\pi/g$ is a one-pitch length of the rod lenses. According to this configuration, an erected image can be obtained.

In the first configuration of the optical imaging system, it is preferable that the overlapping degree m that is defined as $m = X_0/2r_0$, wherein $X_0$ is the image radius that one rod lens projects onto the image plane and $r_0$ is the radius of the portion of the rod lenses functioning as a lens, is in a range of $1.0 \leq m \leq 5.0$. If the overlapping degree m is larger than 5.0, the image becomes too dark and the time for scanning etc. becomes long. If the overlapping degree m is smaller than 1.0, periodical irregularities appear in the brightness of the image plane.

In the first configuration of the optical imaging system, it is preferable that a parallel plane transparent substrate is arranged so that the object plane is positioned at a front focal position of the rod lens array. According to this embodiment, the object plane can be set at the front focal position just by pressing the manuscript to the surface of the transparent substrate. In this case, it is preferable that the parallel plane substrate contacts the lens surfaces of the rod lens array. This can be easily realized by adjusting the thickness of the transparent substrate. According to this embodiment, the adjustment of the distance between the rod lens array and the front focal position can be simplified, which makes the assembly of the optical imaging system cheaper.

A second configuration of an optical imaging system for focusing light from an object plane onto an image plane in accordance with the present invention comprises a rod lens array having a plurality of rod lenses with a refractive index distribution in a radial direction that are arranged in two rows so that their optical axes are parallel. The refractive index distribution of the rod lenses can be expressed by $$n(r)^2 = n_0^2 \cdot \{1 - (g \cdot r)^2 + h_4 \cdot (g \cdot r)^4 + h_6 \cdot (g \cdot r)^6\} \qquad \text{(Eq. 39)}$$

wherein r is a radial distance from an optical axis of the rod lenses, $n_0$ is the refractive index at the optical axis of the rod lenses, and g, $h_4$ and $h_6$ are coefficients of the refractive index distribution. Constants a, b, c, d, and e are given by $$a = -10^{LA}$$

$$LA = 3.6631 - 25.192(g \cdot r_0) + 103.73(g \cdot r_0)^2 - 170.81(g \cdot r_0)^3 \qquad \text{(Eq. 40)}$$

$$b = 10^{LB}$$

$$LB = 3.3489 - 21.092(g \cdot r_0) + 78.535(g \cdot r_0)^2 - 128.31(g \cdot r_0)^3 \qquad \text{(Eq. 41)}$$

$$c = 1 \qquad \text{(Eq. 42)}$$

$$d = 10^{LD} \cdot (1.7805 - 0.6275 \, m - 0.064757 \, m^2)$$

$$LD = 2.358 - 22.161(g \cdot r_0) + 84.009(g \cdot r_0)^2 - 141.6(g \cdot r_0)^3 \qquad \text{(Eq. 43)}$$

$$e = 10^{LE} \cdot 10^{LE2}$$

$$LE = 5.3197 - 48.816(g \cdot r_0) + 197.65(g \cdot r_0)^2 - 317.05(g \cdot r_0)^3$$

$$LE2 = 0.56302 - 0.42878 \, m + 0.042574 \, m^2 \qquad \text{(Eq. 44)}$$

wherein $r_0$ is the radius of the portion of the rod lenses functioning as a lens, and m is the overlapping degree. The refractive index distribution coefficients $h_4$ and $h_6$ are in the ranges defined by $$c - d \leq h_4 \leq c + d \qquad \text{(Eq. 45)}$$

and $$\{(h_4 c)/d\}^2 + [\{h_6 - (a \cdot h_4 + b)\}/e]^2 \leq 1. \qquad \text{(Eq. 46)}$$

According to this second configuration, an optical imaging system can be realized, which comprises a plurality of rod lenses, arranged in an array, that have a suitable refractive index distribution for attaining a high resolving power of at least 12 line-pairs/mm (ca. 600 dpi) if the outer diameter of the lenses is 0.6 mm.

In the second configuration of the optical imaging system, it is preferable that the refractive distribution coefficients $h_4$ and $h_6$ are in the ranges defined by $$c - d/2 \leq h_4 \leq c + d/2 \qquad \text{(Eq. 47)}$$

$$\{2(h_4 - c)/d\}^2 + [2\{h_6 - (a \cdot h_4 + b)\}/e]^2 \leq 1. \qquad \text{(Eq. 48)}$$

According to this configuration, an optical imaging system with a more preferable refractive index distribution can be realized.

In the second configuration of the optical imaging system, it is preferable that the refractive index $n_0$ at the optical axis of the rod lenses is in a range of $1.4 \leq n_0 \leq 1.8$.

In the second configuration of the optical imaging system, it is preferable that the product $g \cdot r_0$ of the refractive index distribution coefficient g and the radius $r_0$ of the portion functioning as a lens is in a range of $0.04 \leq g \cdot r_0 \leq 0.27$. If $g \cdot r_0$ is smaller than 0.04, the image becomes too dark and the time for scanning etc. becomes long. If $g \cdot r_0$ is larger than 0.27, the influence of the image curvature and the astigmatism becomes too large and the resolving power decreases.

In the second configuration of the optical imaging system, it is preferable that the refractive index distribution of the rod lenses is given by $$n(r)^2 = n_0^2 \cdot \{1-(g \cdot r)^2 + f(r)\} \tag{Eq. 49}$$

wherein $f(r)$ is a function of $r$ that satisfies $$h_{4A} \cdot (g \cdot r)^4 + h_{6A} \cdot (g \cdot r)^6 \leq f(r) \leq h_{4B} \cdot (g \cdot r)^4 + h_{6B} \cdot (g \cdot r)^6 \tag{Eq. 50}$$

in a range of $0 \leq r \leq r_0$ ($r_0$: radius of the portion of the rod lenses functioning as a lens) for two groups of refractive index distribution coefficients ($n_0$, g, $h_{4A}$, $h_{6A}$) and ($n_0$, g, $h_{4B}$, $h_{6B}$) that are in the ranges defined by Eq. 40–Eq. 46.

In the second configuration of the optical imaging system, it is preferable that the radius $r_0$ of the portion of the rod lenses functioning as a lens is in a range of $0.05 \text{ mm} \leq r_0 \leq 0.60 \text{ mm}$. According to this configuration, production and assembly of the rod lenses become easy, and the aberrations of the rod lens array can be kept small.

Since the refractive index distribution at the peripheral portion of the rod lenses can differ considerably from the designed value, this portion often cannot be used for the lens. Also, sometimes the lenses comprise a light-absorbing layer to prevent stray light that may be due to total reflection at the lens side surface. Moreover, depending on the conditions for assembling the rod lens array, sometimes the rod lenses are arranged with a certain distance between each other. Therefore, it is preferable that in the first configuration of the optical imaging system, $r_0/R$ is in the range $0.5 \leq r_0/R \leq 1.0$, wherein $r_0$ is the radius of the portion of the rod lenses functioning as a lens and $2R$ is a distance between the optical axis of two neighboring rod lenses.

In the second configuration of the optical imaging system, it is preferable that $Z_0/P$ is in the range $0.5 < Z_0/P < 1.0$, wherein $Z_0$ is a length of a rod lens and $P=2\pi/g$ is a one-pitch length of the rod lenses. According to this configuration, an erected image can be obtained.

In the second configuration of the optical imaging system, it is preferable that the overlapping degree m that is defined as $m=X_0/2r_0$, wherein $X_0$ is the image radius that the rod lenses project onto the image plane and $r_0$ is the radius of the portion of the rod lenses functioning as a lens, is in a range of $1.0 \leq m \leq 5.0$. If the overlapping degree m is larger than 5.0, the image becomes too dark and the time for scanning etc. becomes long. If the overlapping degree m is smaller than 1.0, periodical irregularities appear in the brightness of the image plane.

In the second configuration of the optical imaging system, it is preferable that a parallel plane transparent substrate is arranged so that the object plane is positioned at a front focal position of the rod lens array. According to this embodiment, the object plane can be set at the front focal position just by pressing the manuscript to the surface of the transparent substrate. In this case, it is preferable that the parallel plane substrate contacts the lens surfaces of the rod lens array. This can be easily realized by adjusting the thickness of the transparent substrate. According to this embodiment, the adjustment of the distance between the rod lens array and the front focal position can be simplified, which makes the assembly of the optical imaging system cheaper.

DESCRIPTION OF THE PREFERRED EMBODIMENTS

The following is a more detailed description of the embodiments of the present invention.

First Embodiment

Figure 1:
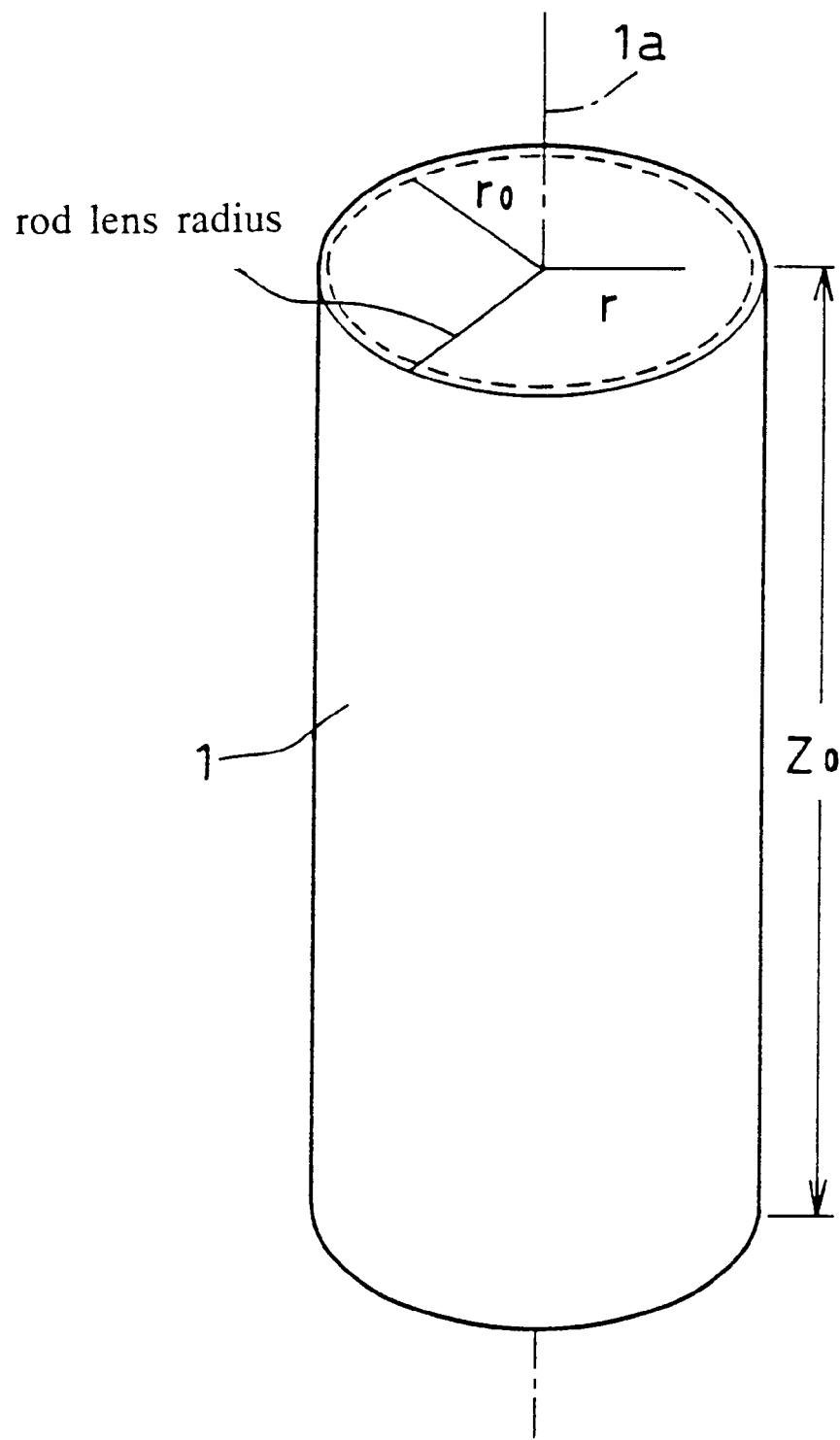
FIG. 1 is a perspective view of a rod lens used in the optical imaging system according to a first and a second embodiment of the present invention.
Figure 2:
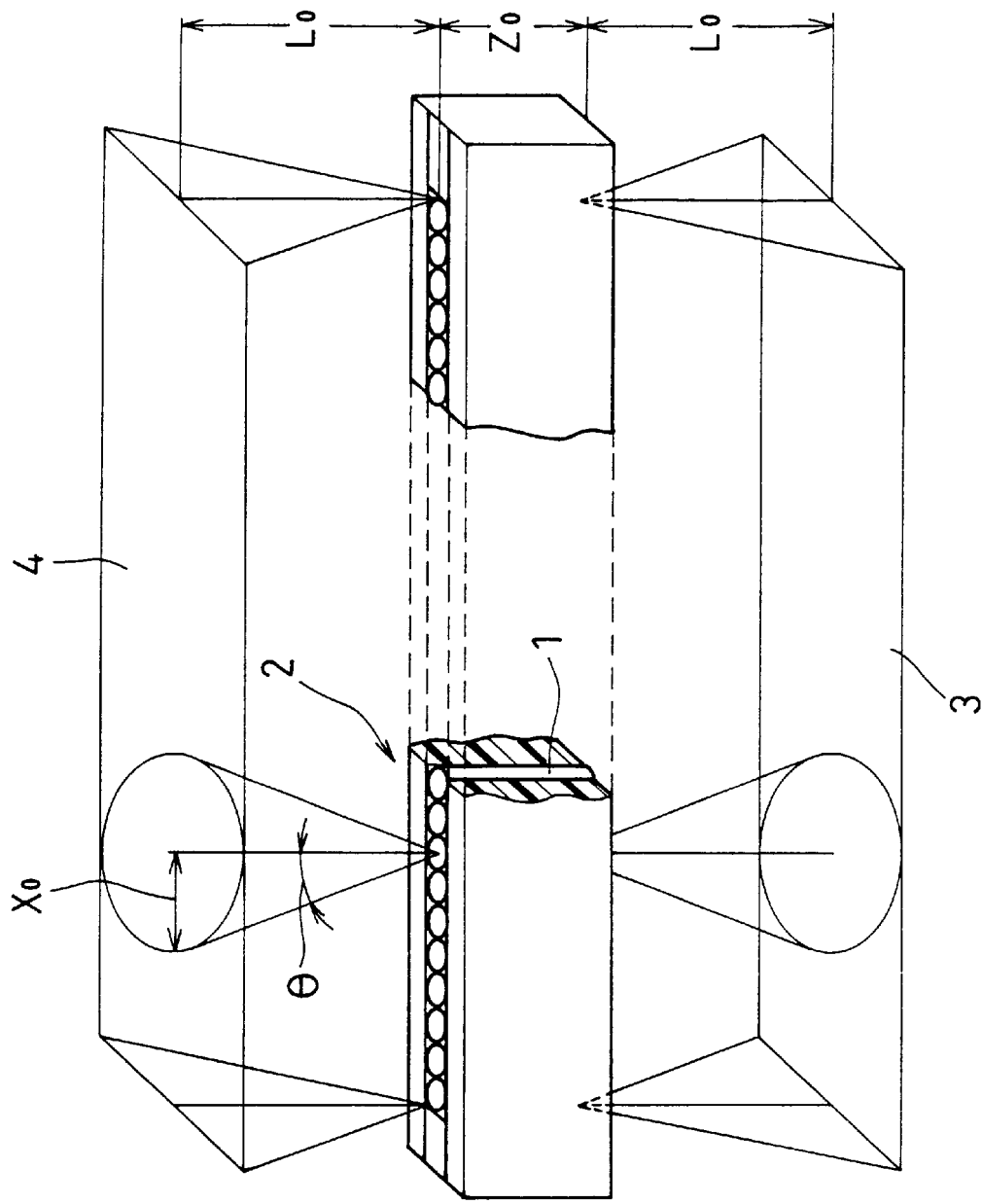
FIG. 2 is a perspective view of an optical imaging system according to the first embodiment of the present invention.

As is shown in FIGS. 1 and 2, a plurality of columnar rod lenses 1 with a refractive index distribution in the radial direction is arranged in one row in a rod lens array 2 for one-to-one imaging with their optical axes 1a in parallel. This optical imaging system focuses light from an object plane 3 onto an image plane 4, the planes being arranged on the two sides of the rod lens array 2.

Figure 3:
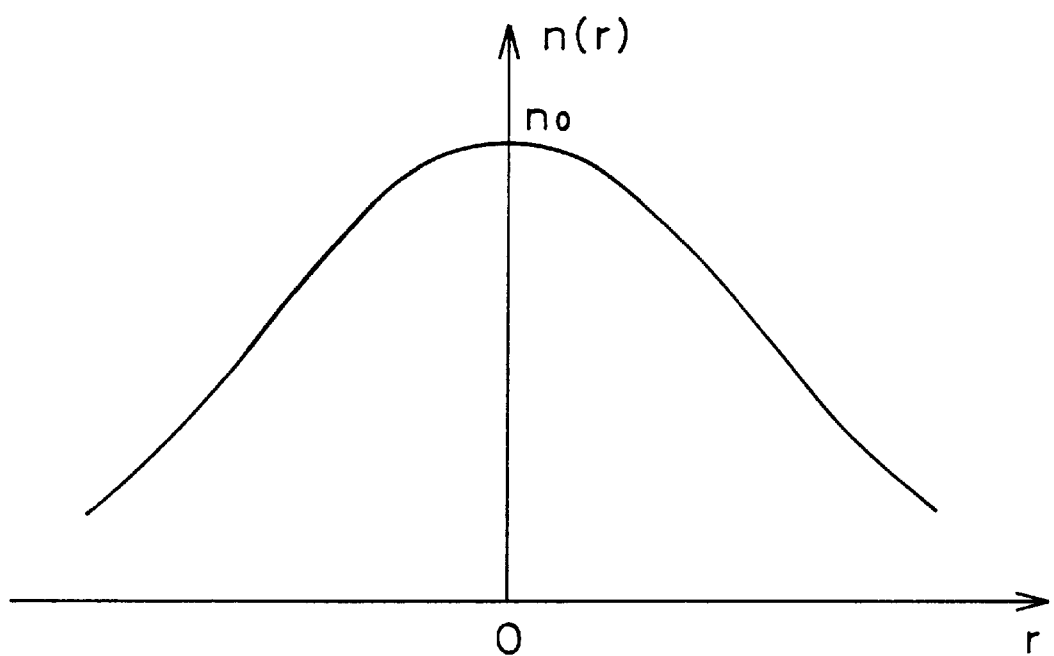
FIG. 3 is a graph of the refractive index distribution of the rod lenses used in the optical imaging system according to the first and the second embodiment of the present invention.

As is shown in FIG. 3, the refractive index n of the rod lenses 1 underlies a distribution in the radial direction, which can be expressed by $$n(r)^2 = n_0^2 \cdot \{1 - (g \cdot r)^2 + h_4 \cdot (g \cdot r)^4 + h_6 \cdot (g \cdot r)^6\} \qquad \text{(Eq. 51)}$$

wherein r is a radial distance from an optical axis 1a of the rod lenses 1, n(r) is the refractive index at the radial distance r from the optical axis 1a of the rod lens 1, $n_0$ is the refractive index at the optical axis 1a of the rod lenses 1 (center refractive index), and g, $h_4$ and $h_6$ are coefficients of the refractive index distribution.

Figure 4:
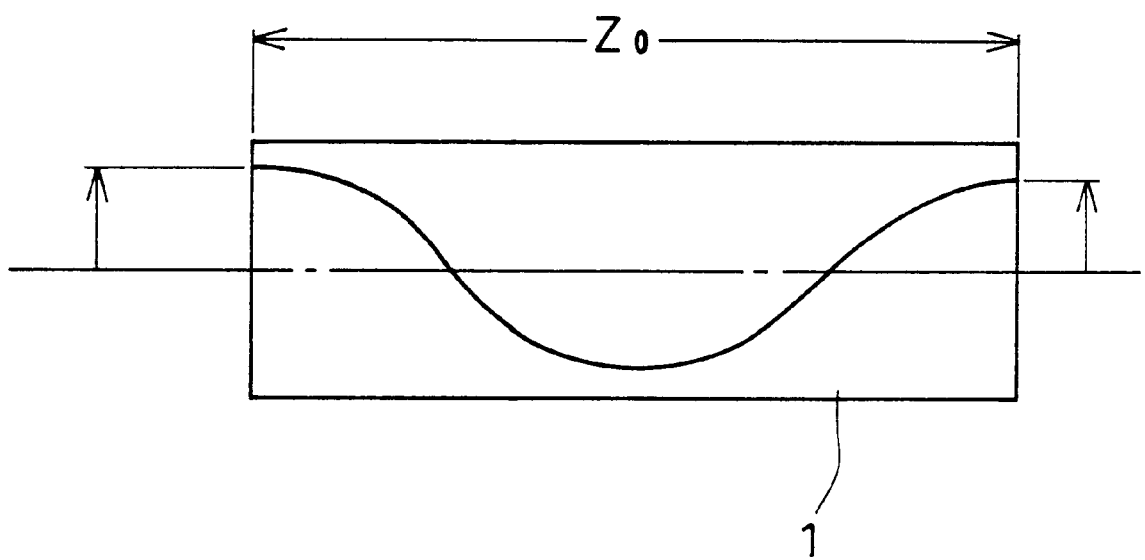
FIG. 4 is a schematic drawing illustrating the image-formation with a rod lens used in the optical imaging system according to the first and the second embodiment of the present invention.

To attain erected images as shown in FIG. 4, the ratio $Z_0/P$ of the length $Z_0$ of the rod lenses 1 and a one-pitch length $P = 2\pi/g$ of the rod lenses 1 has to be in the range $0.5 < Z_0/P < 1.0$.

The distance $L_0$ between the edge (lens surface) of the rod lens array 2 and the object plane 3 and the distance $L_0$ between the edge (lens surface) of the rod lens array 2 and the imaging plane 4 (see FIG. 2) can be expressed by $$L_0 = -\{1/(n_0 \cdot g)\} \cdot \tan(Z_0 \pi/P). \qquad \text{(Eq. 52)}$$

It is preferable that the radius $r_0$ of the effective rod lens portion, that is the radius of the rod lens portion functioning as a lens, is in a range of $0.05 \text{ mm} \leq r_0 \leq 0.60 \text{ mm}$.

Lenses with a small $r_0$ can attain a high resolution more easily, because the amount of image distortion due to the various aberrations of the rod lenses 1 increases proportionally with the size of the entire lens. On the other hand, rod lenses 1 with an $r_0$ smaller than 0.05 mm are difficult to produce and to assemble. Also, when the radius $r_0$ of the effective rod lens portions in the rod lens array 2 is larger than 0.60 mm, the aberration becomes too large.

The realizable value $n_0$ for the refractive index at the optical axis 1a of the rod lenses 1 (center refractive index) depends on the material for the rod lenses (glass or synthetic resin) and is in the range of $1.4 \leq n_0 \leq 1.8$. The brightness of the rod lenses 1 depends on the dimensionless factor $g \cdot r_0$ or from the aperture angle indicating the range over which the lenses can accept light. The aperture angle $\theta$ (°) can be expressed by $$\theta = (n_0 \cdot g \cdot r_0)/(\pi/180). \qquad \text{(Eq. 53)}$$

It is preferable that the dimensionless factor $g \cdot r_0$ is in the range $0.04 \leq g \cdot r_0 \leq 0.27$. If $g \cdot r_0$ is smaller than 0.04, the image becomes too dark and the time for scanning etc. becomes long. If $g \cdot r_0$ is larger than 0.27, the influence of the image curvature and the astigmatism becomes too large and the resolving power decreases.

The preferable range for $g \cdot r_0$, for example for a center refractive index of $n_0 = 1.60$, corresponds to about $4° \leq \theta \leq 24°$.

Figure 5:
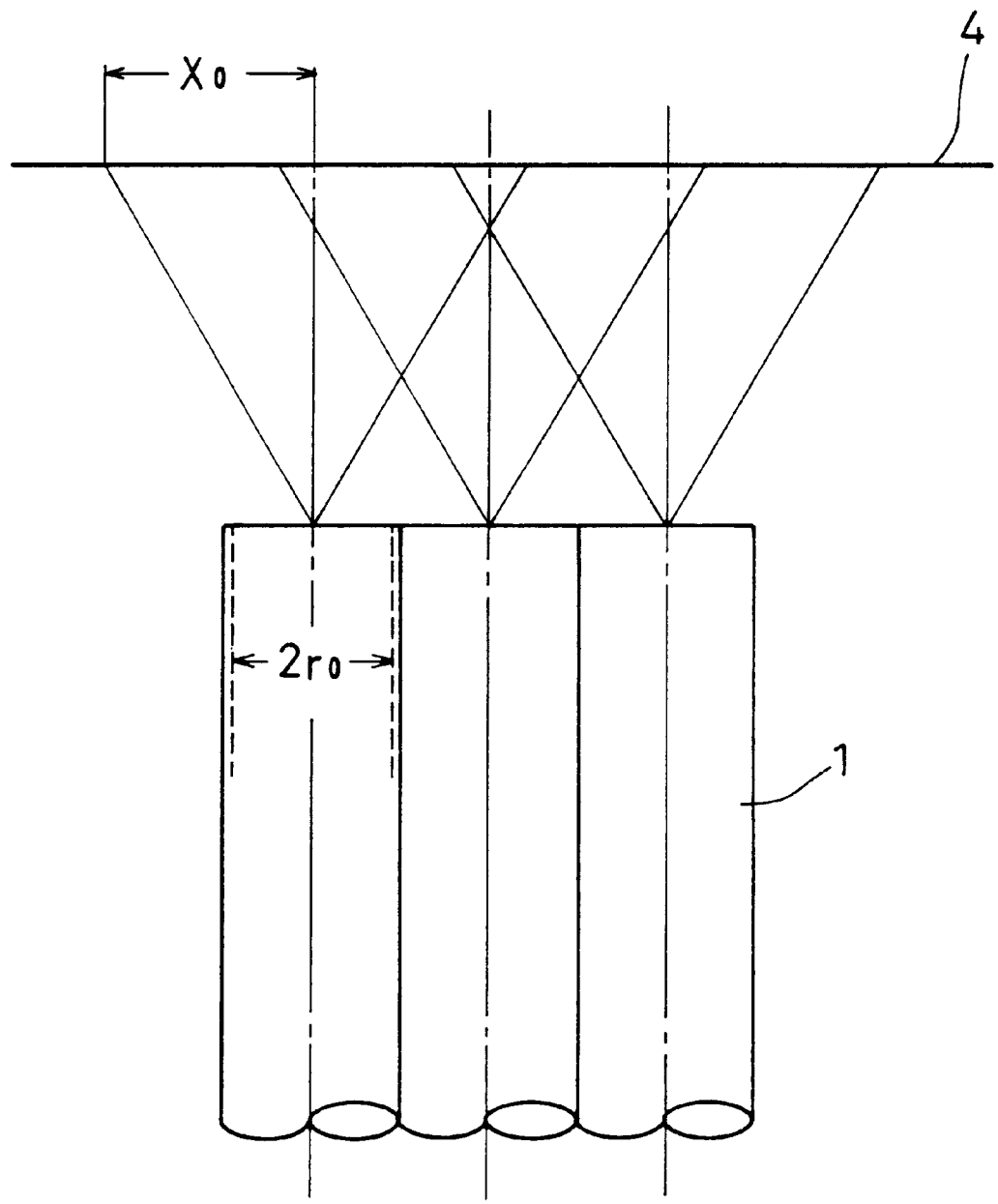
FIG. 5 is a schematic drawing of an image composition by the rod lenses used in the optical imaging system according to the first and the second embodiment of the present invention.

In an optical imaging system comprising such a rod lens array 2, a compound image is formed by the rod lenses 1 on the image plane 4, as is shown in FIG. 5, so that it is convenient to introduce a dimensionless factor describing the amount of overlap, that is, the so-called "overlapping degree". This overlapping degree m can be expressed as $$m = X_0/2r_0 \tag{Eq. 54}$$

wherein $X_0$ is the image radius (field of view) that a single rod lens 1 projects onto the image plane 4 and is defined as $X_0 = -r_0/\cos(Z_0\pi/P)$.

It is preferable that the overlapping degree m of the rod lens array 2 is in the range $1.0 \leq m \leq 5.0$. If the overlapping degree m is larger than 5.0, the image becomes too dark and the time for scanning etc. becomes long. If the overlapping degree m is smaller than 1.0, periodical irregularities appear in the brightness of the image plane 4.

It is very desirable to match the distance 2R between the optical axes of neighboring rod lenses 1 with $2r_0$ (diameter of the effective lens portion of the rod lenses 1), since then the largest amount of light can be focused onto the image. However, since the refractive index distribution at the peripheral portion of the rod lenses 1 can differ considerably from the designed value, this portion can often not be used for the lens. Also, sometimes the lenses comprise a light-absorbing layer to prevent stray light due to total reflection at the lens side surface. Moreover, depending on the conditions for assembling the rod lens array 2, sometimes the rod lenses 1 are arranged with a certain distance between each other. Considering the above circumstances, the ratio $r_0/R$ is set in the range of $0.5 \leq r_0/R \leq 1.0$.

When developing the present invention, the inventors took the standard for "high resolution" to mean "a value of at least 50% for the MTF of a 24 line-pairs/mm pattern on a center line of a rod lens array 2 comprising a plurality of rod lenses 1, which have an effective lens portion radius $r_0$ of 0.15 mm and are arranged in one row so that their optical axes 1a are parallel", and determined the refractive index distribution coefficients $h_4$ and $h_6$ that fulfill this standard.

Figure 6:
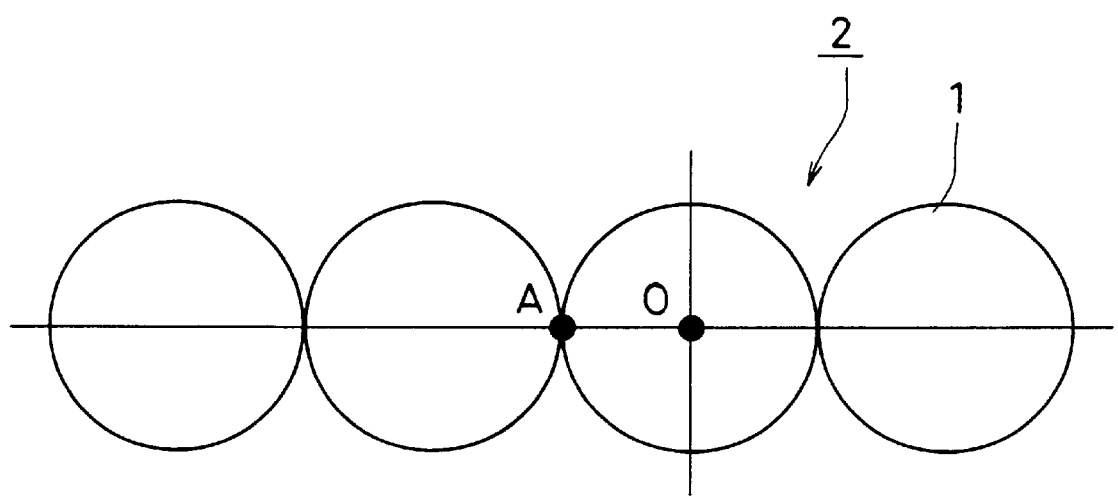
FIG. 6 is a schematic drawing illustrating the measurement point of the MTF values for the optical imaging system according to the first embodiment of the present invention.

To be specific, a rod lens array 2 with the above configuration was designed. Ray tracing was performed taking the perpendicular projection of point A as indicated in FIG. 6 onto the object plane for the light source. The MTF values of a 24 line-pairs/mm pattern were calculated for the X direction and for the Y direction, and the smaller value was taken as the MTF value for the rod lens array 2. The optical design software "Oslo Six" by Sinclair Optics (US) was used for the ray tracing. Then, for a rod lens array 2 with parameters as shown in Table 1, a range of the refractive index distribution coefficients $h_4$ and $h_6$ for which the MTF value of a 24 line-pairs/mm pattern is at least 50% was determined. This range is called "good image range" of the refractive index distribution coefficients $h_4$ and $h_6$ below. The wavelength $\lambda$ of the light for the calculation of the MTF value was taken to be 587.6 nm. The upper limit of the resolving power due to diffraction is sufficiently larger than necessary for this good image range. Consequently, in the wavelength region where the rod lens array is normally used (about 300–2000 nm), the same good image range can be applied regardless of the wavelength.

TABLE 1

| | $n_0$ | g (mm$^{-1}$) | r0 (mm) | g · r$_0$ | θ (°) | $Z_0$ (mm) | $L_0$ (mm) | m |
|---|---|---|---|---|---|---|---|---|
| A1 | 1.60 | 0.29089 | 0.15 | 0.04363 | 4 | 13.140 | 6.0675 | 1.50 |
| A2 | 1.60 | 0.43633 | 0.15 | 0.06545 | 6 | 8.758 | 4.0506 | 1.50 |

TABLE 1-continued

| | $n_0$ | g (mm$^{-1}$) | r0 (mm) | g · r$_0$ | θ (°) | $Z_0$ (mm) | $L_0$ (mm) | m |
|---|---|---|---|---|---|---|---|---|
| A3 | 1.60 | 0.65450 | 0.15 | 0.09817 | 9 | 5.838 | 2.7023 | 1.50 |
| A4 | 1.60 | 0.87266 | 0.15 | 0.13090 | 12 | 4.379 | 2.0253 | 1.50 |
| A5 | 1.60 | 1.09083 | 0.15 | 0.16362 | 15 | 3.503 | 1.6208 | 1.50 |
| A6 | 1.60 | 1.30900 | 0.15 | 0.19635 | 18 | 2.919 | 1.3511 | 1.50 |
| A7 | 1.60 | 1.74533 | 0.15 | 0.26180 | 24 | 2.189 | 1.0141 | 1.50 |
| B1 | 1.40 | 0.87266 | 0.15 | 0.13090 | 10.5 | 4.379 | 2.3147 | 1.50 |
| B2 | 1.60 | 0.87266 | 0.15 | 0.13090 | 12 | 4.379 | 2.0253 | 1.50 |
| B3 | 1.80 | 0.87266 | 0.15 | 0.13090 | 13.5 | 4.379 | 1.8003 | 1.50 |
| C1 | 1.60 | 0.87266 | 0.15 | 0.13090 | 12 | 4.800 | 1.2405 | 1.00 |
| C2 | 1.60 | 0.87266 | 0.15 | 0.13090 | 12 | 4.379 | 2.0253 | 1.50 |
| C3 | 1.60 | 0.87266 | 0.15 | 0.13090 | 12 | 4.179 | 2.7743 | 2.00 |
| C4 | 1.60 | 0.87266 | 0.15 | 0.13090 | 12 | 3.984 | 4.2345 | 3.00 |
| C5 | 1.60 | 0.87266 | 0.15 | 0.13090 | 12 | 3.887 | 5.6890 | 4.00 |
| C6 | 1.60 | 0.87266 | 0.15 | 0.13090 | 12 | 3.830 | 7.1130 | 5.00 |

Figure 7:
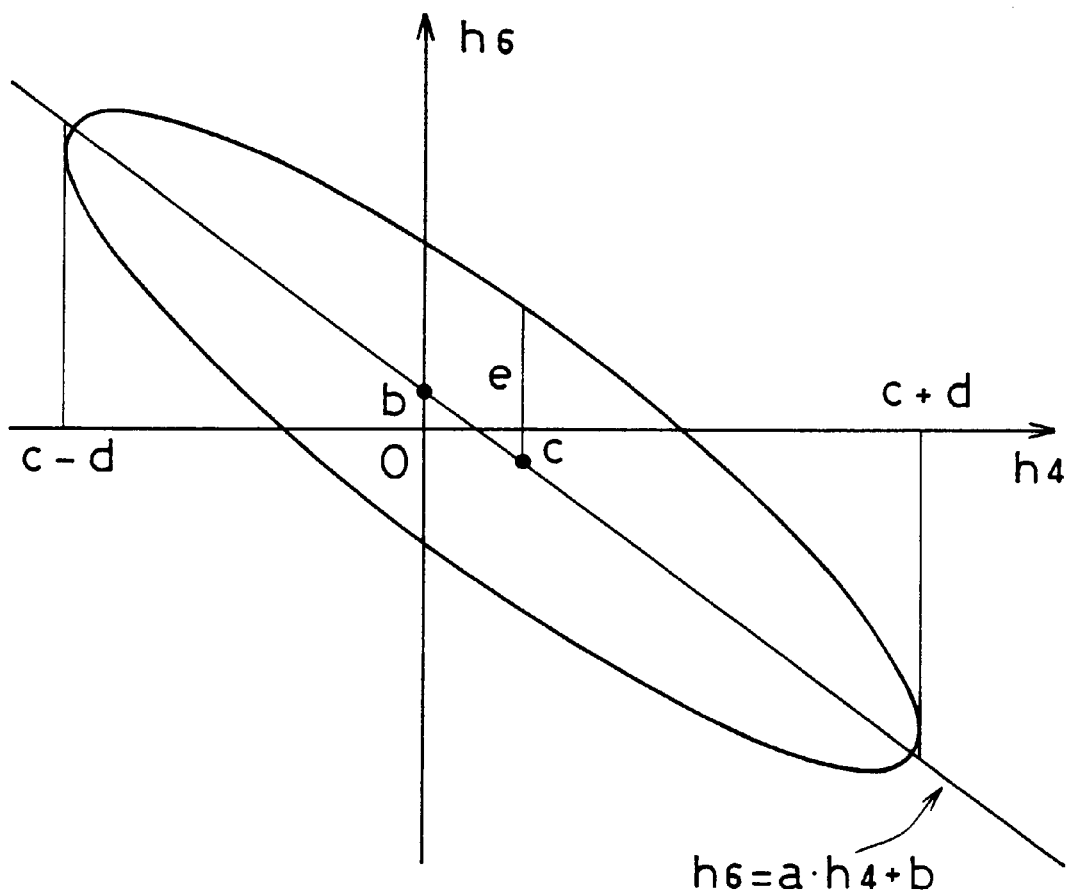
FIG. 7 illustrates the "good image range" for the refractive index distribution coefficients $h_4$ and $h_6$ of the rod lenses used in the optical imaging system according to the first and the second embodiment of the present invention.
Figure 8:
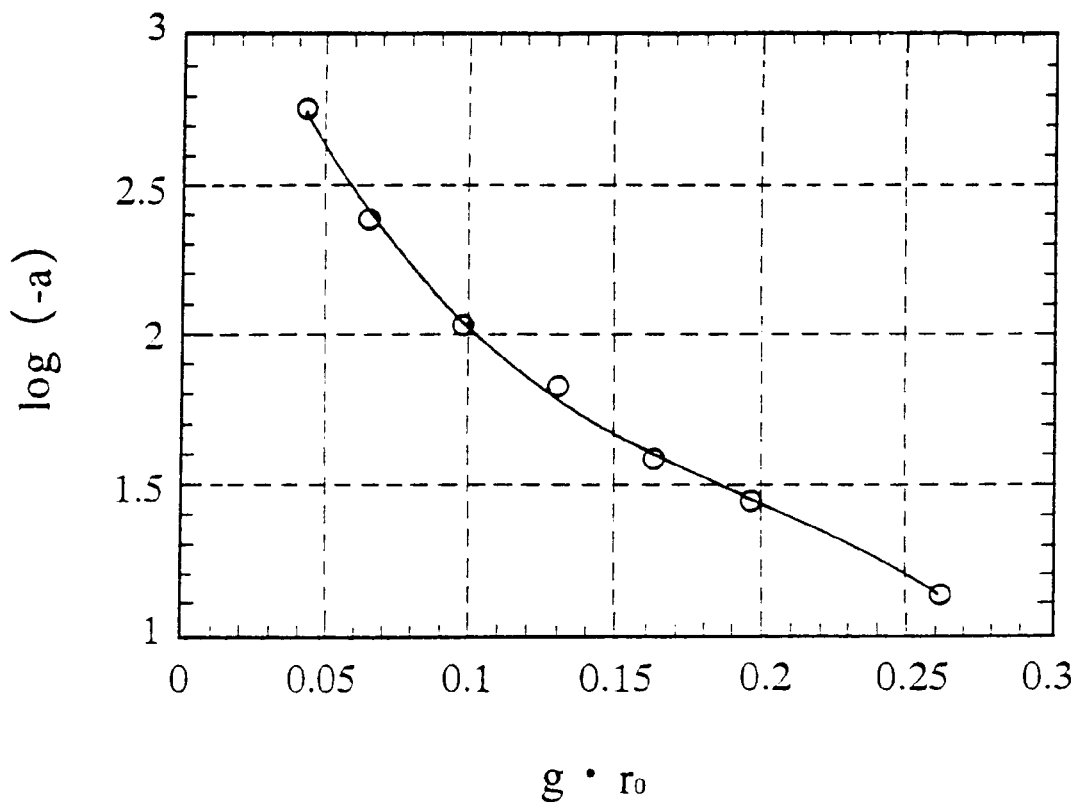
FIG. 8 illustrates the dependency of the constant a, which governs the good image range for the refractive index distribution coefficients $h_4$ and $h_6$ of the rod lenses used in the optical imaging system according to the first embodiment of the present invention, upon the dimensionless factor $g \cdot r_0$.
Figure 9:
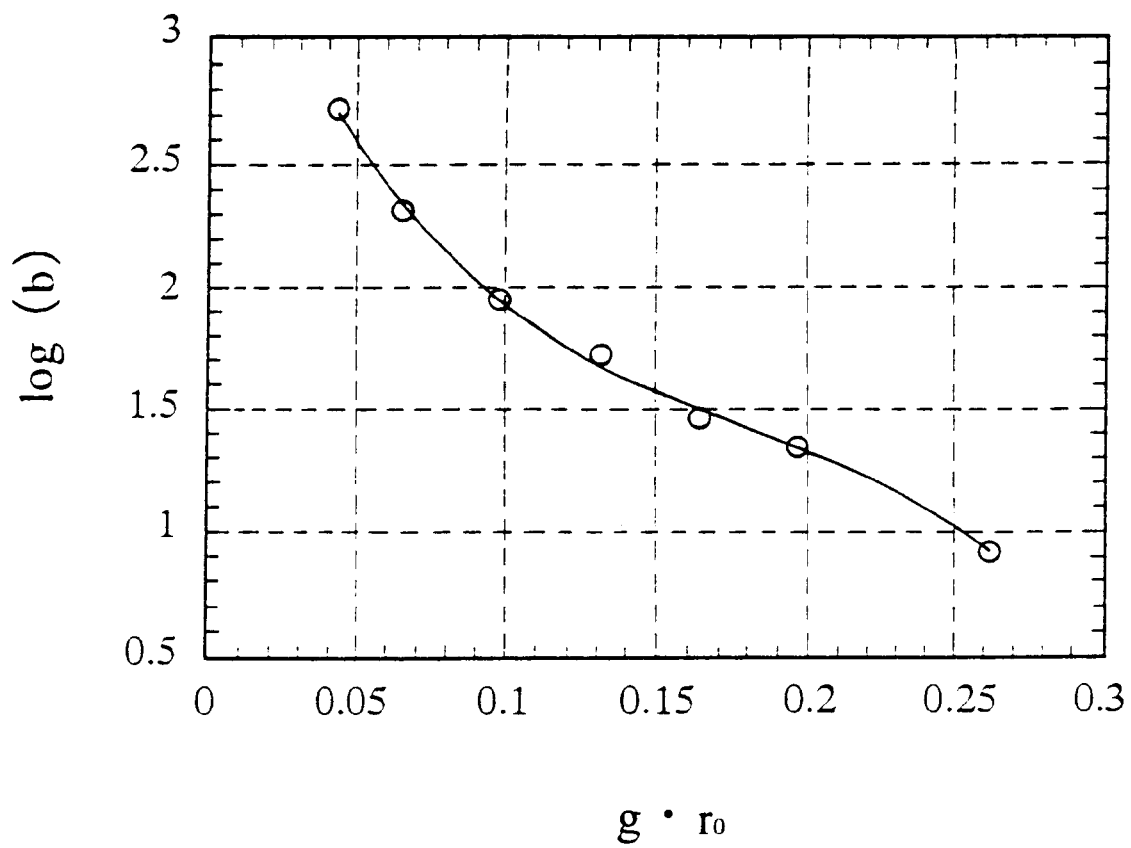
FIG. 9 illustrates the dependency of the constant b, which governs the good image range for the refractive index distribution coefficients $h_4$ and $h_6$ of the rod lenses used in the optical imaging system according to the first embodiment of the present invention, upon the dimensionless factor $g \cdot r_0$.
Figure 10:
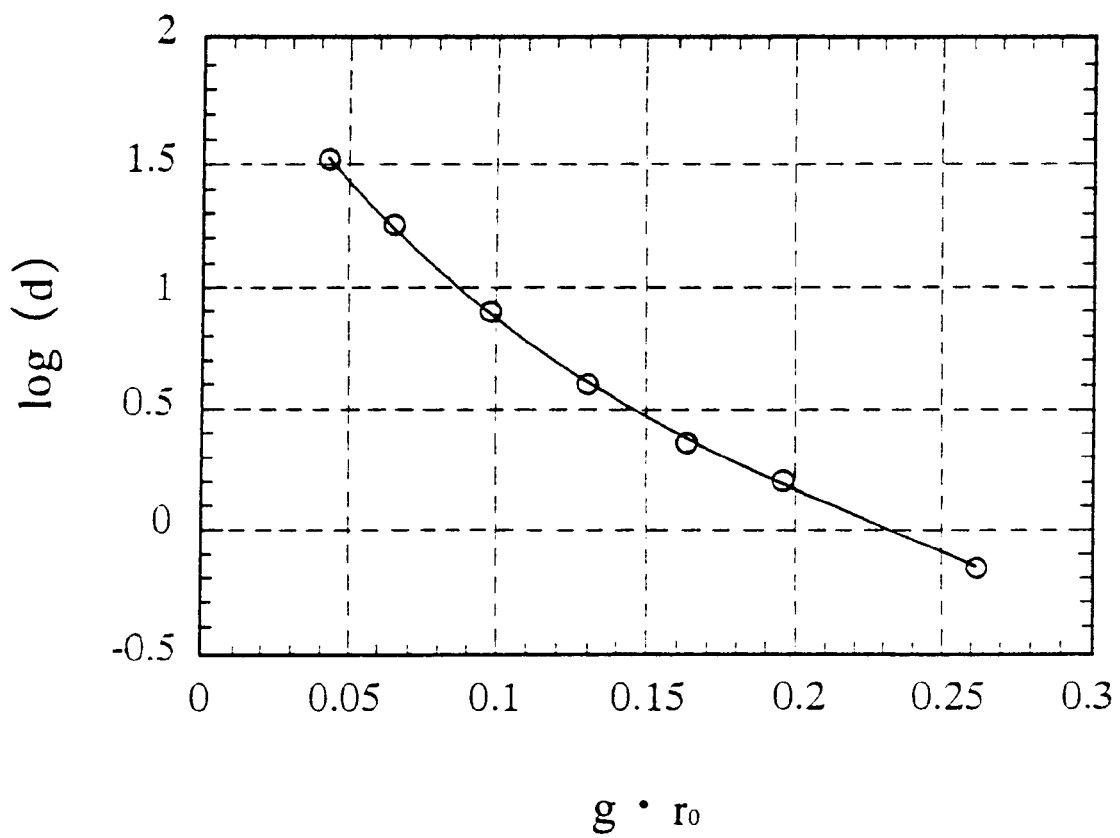
FIG. 10 illustrates the dependency of the constant d, which governs the good image range for the refractive index distribution coefficients $h_4$ and $h_6$ of the rod lenses used in the optical imaging system according to the first embodiment of the present invention, upon the dimensionless factor $g \cdot r_0$.
Figure 11:
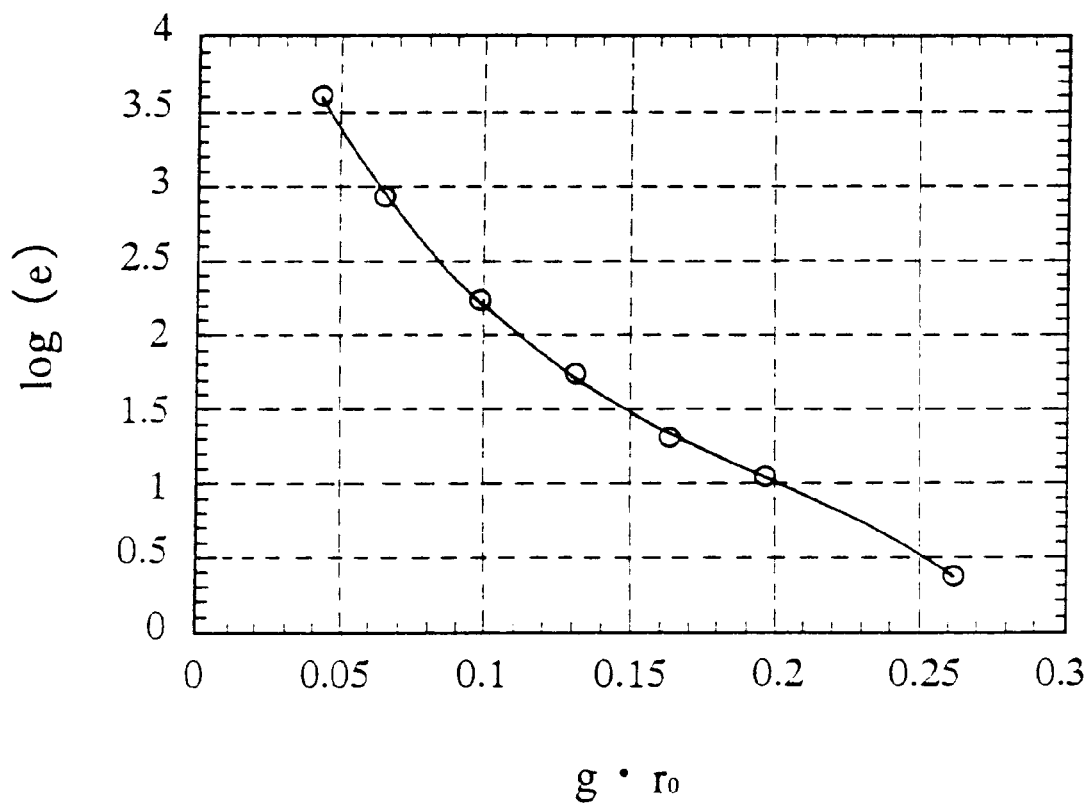
FIG. 11 illustrates the dependency of the constant e, which governs the good image range for the refractive index distribution coefficients $h_4$ and $h_6$ of the rod lenses used in the optical imaging system according to the first embodiment of the present invention, upon the dimensionless factor $g \cdot r_0$.

Under any of the conditions shown in Table 1, the good image range can be drawn as a narrow ellipse in a Cartesian coordinate system having $h_4$ as the X-axis and $h_6$ as the Y-axis, as shown in FIG. 7. This good image range can be expressed by $$c - d \leq h_4 \leq c + d \tag{Eq. 55}$$

$$\{(h_4-c)/d\}^2 + [\{h_6-(a \cdot h_4+b)\}/e]^2 \leq 1 \tag{Eq. 56}$$

wherein a is the slope of the central axis, b is the intercept of the central axis with the $h_6$-axis, c is the $h_4$-coordinate of the center of the central axis, d is the half width of the range spanned by the ellipse in the $h_4$-direction, e is the half width of the ellipse in the $h_6$-direction at its central $h_4$-value.

The following is a discussion of how changes of the dimensionless factor $g \cdot r_0$, the refractive index $n_0$ at the optical axis 1a of the rod lenses 1 (central refractive index), and the overlapping degree m influence these constants a, b, c, d, and e.

① Influence of a Change of $g \cdot r_0$

FIGS. 8 to 11 show the dependency of the constants a, b, c, d and e on the dimensionless factor $g \cdot r_0$ under the conditions A1–A7 in Table 1 (i.e., the refractive index $n_0 = 1.60$ at the optical axis 1a of the rod lenses 1 (central refractive index), a radius $r_0 = 0.15$ mm of the effective lens portion, and an overlapping degree m=1.50). The constant c has the constant value 1.

From FIGS. 8 to 11, the constants a, b, d, and e can be expressed as polynomials of the dimensionless factor $g \cdot r_0$:

$$\log(-a) = 3.632 - 24.54(g \cdot r_0) + 102.4(g \cdot r_0)^2 - 172.8(g \cdot r_0)^3 \tag{Eq. 57}$$

$$\log(b) = 3.729 - 28.78(g \cdot r_0) + 131.4(g \cdot r_0)^2 - 238.6(g \cdot r_0)^3 \tag{Eq. 58}$$

$$\log(d) = 2.216 - 18.01(g \cdot r_0) + 53.51(g \cdot r_0)^2 - 73.59(g \cdot r_0)^3 \tag{Eq. 59}$$

$$\log(e) = 5.327 - 47.81(g \cdot r_0) + 197.7(g \cdot r_0)^2 - 334.2(g \cdot r_0)^3 \tag{Eq. 60}$$

In Eqs. 57 to 60, "log" means the common logarithm with a base of 10.

② Influence of a Change of $n_0$

Figure 12:
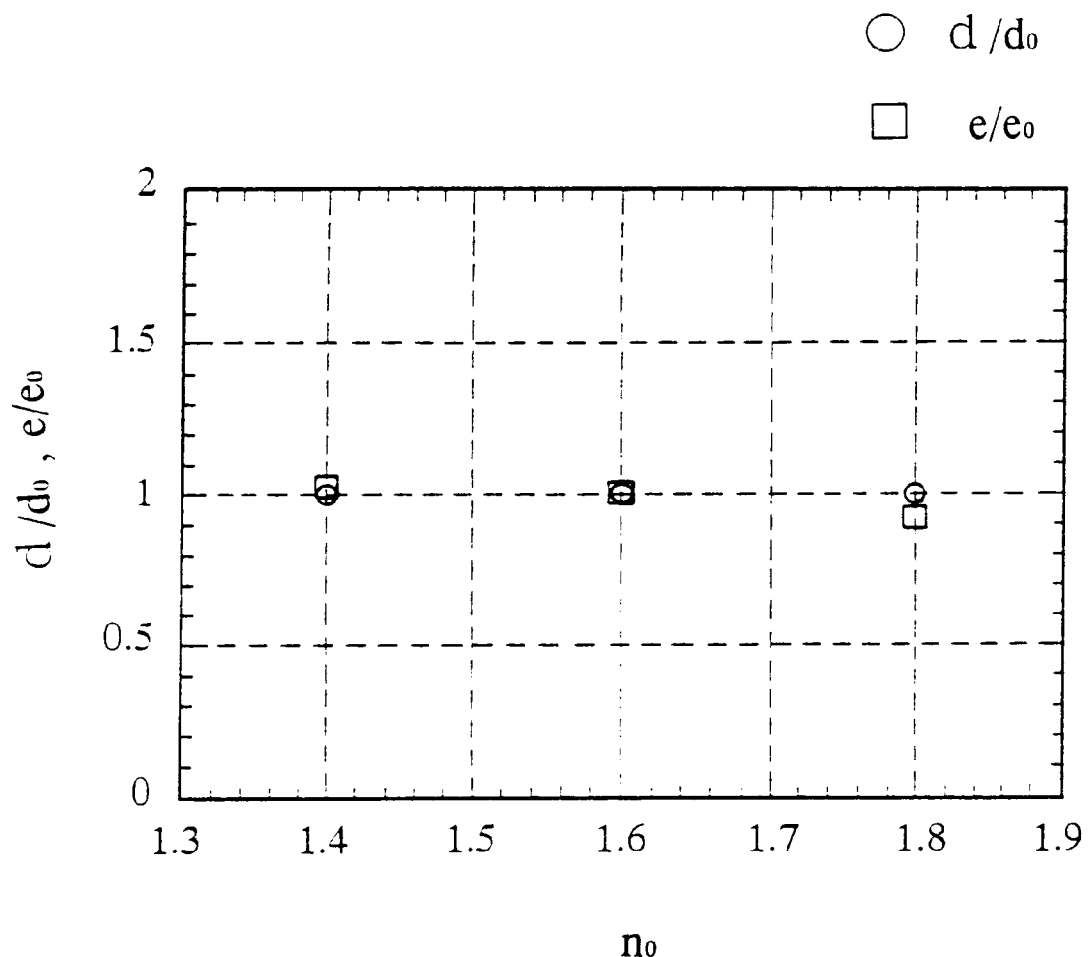
FIG. 12 illustrates the dependency of the constants d and e, which govern the good image range for the refractive index distribution coefficients $h_4$ and $h_6$ of the rod lenses used in the optical imaging system according to the first embodiment of the present invention, upon the refractive index $n_0$ at the optical axis of the rod lenses.

FIG. 12 shows the dependency of the constants d and e on the refractive index $n_0$ at the optical axis 1a of the rod lenses 1 (central refractive index) under the conditions B1–B3 in Table 1 (i.e., a dimensionless factor $g \cdot r_0 = 0.13090$, a radius $r_0 = 0.15$ mm of the effective lens portion, and an overlapping degree m=1.50). The constants a, b, and c have the constant values a=−68, b=+52, c=+1. FIG. 12 shows the values of d and e as normalized values with $d_0$ and $e_0$ indicating the d and e for $n_0 = 1.60$. It can be seen from FIG. 12 that d and e are constant even when $n_0$ is varied.

③ Influence of a Change of m

Figure 13:
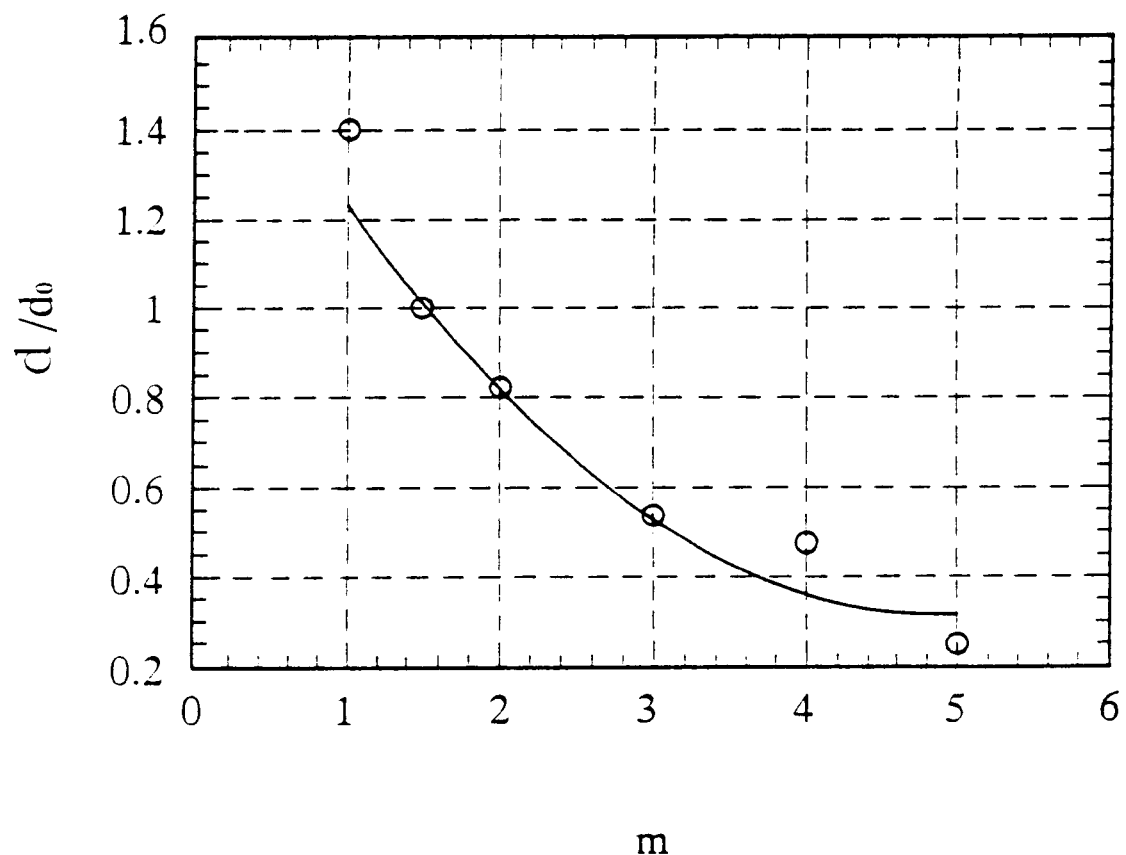
FIG. 13 illustrates the dependency of the constant d, which governs the good image range for the refractive index distribution coefficients $h_4$ and $h_6$ of the rod lenses used in the optical imaging system according to the first embodiment of the present invention, upon the overlapping degree m.
Figure 14:
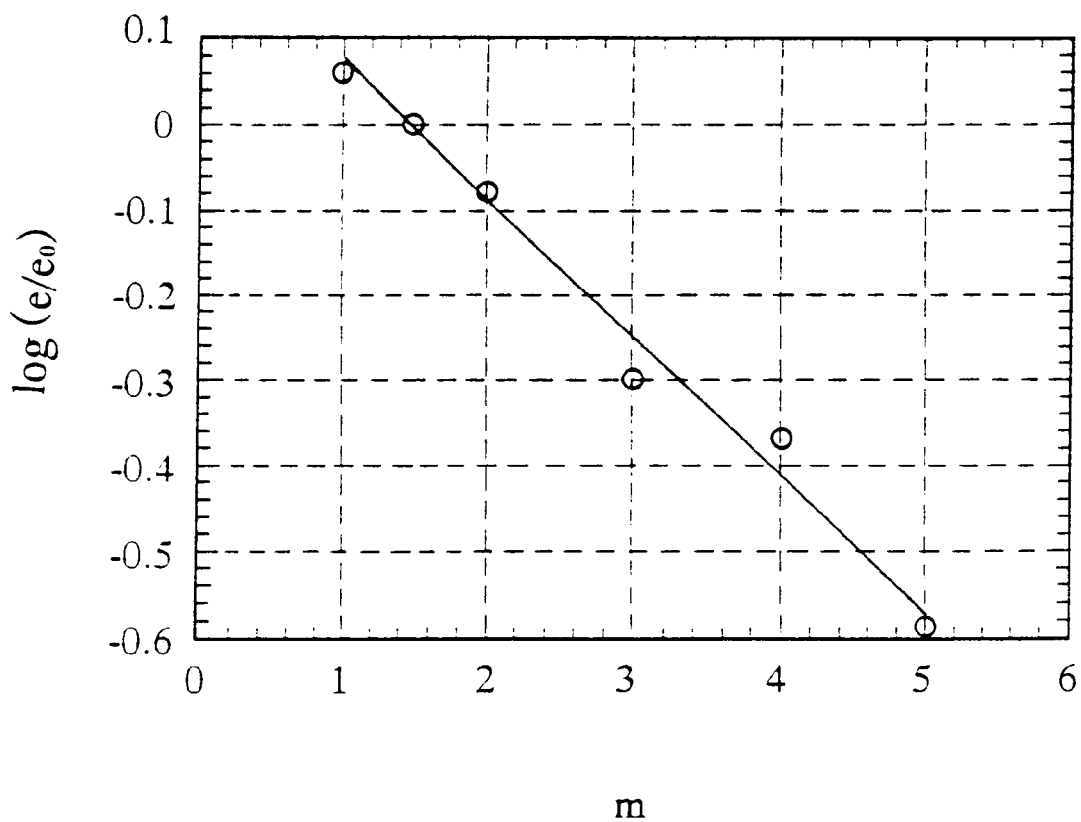
FIG. 14 illustrates the dependency of the constant e, which governs the good image range for the refractive index distribution coefficients $h_4$ and $h_6$ of the rod lenses used in the optical imaging system according to the first embodiment of the present invention, upon the overlapping degree m.
Figure 15:
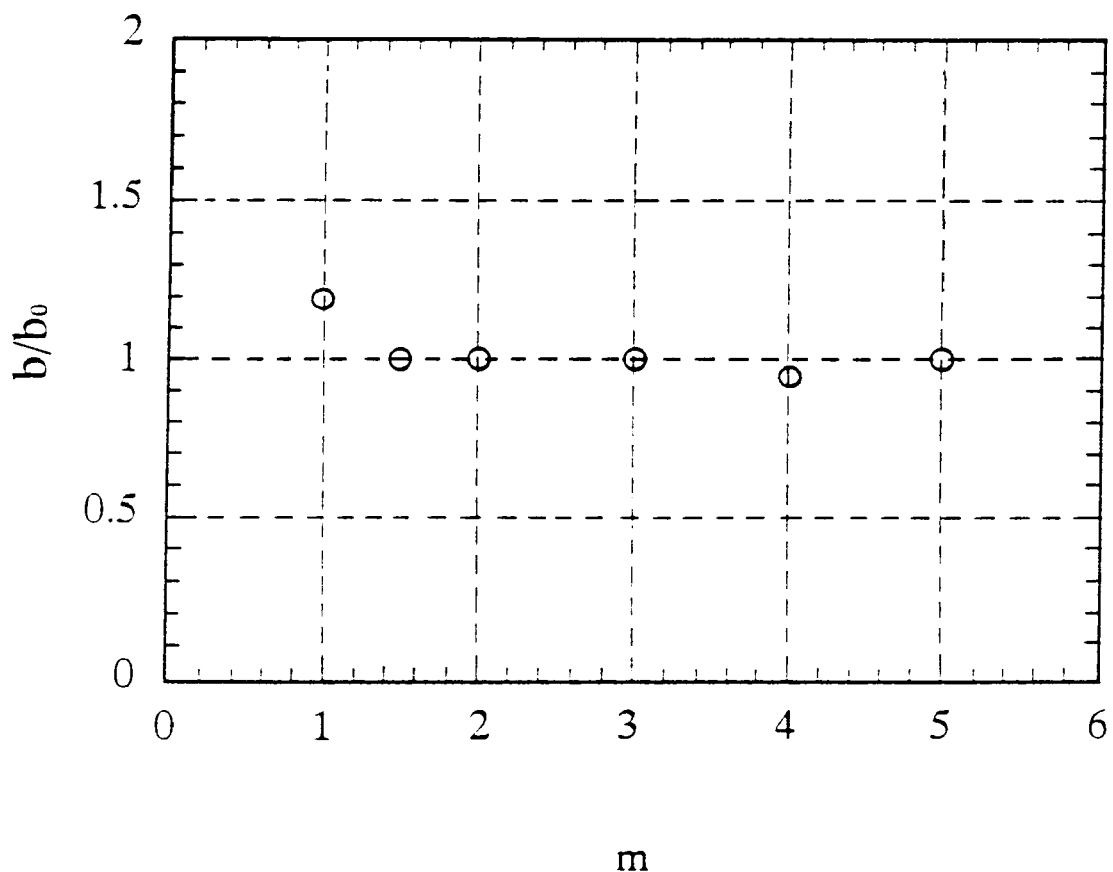
FIG. 15 illustrates the dependency of the constant b, which governs the good image range for the refractive index distribution coefficients $h_4$ and $h_6$ of the rod lenses used in the optical imaging system according to the first embodiment of the present invention, upon the overlapping degree m.

FIGS. 13 and 14 show the dependency of the constants d and e on the overlapping degree m under the conditions C1–C6 in Table 1 (i.e., a dimensionless factor $g \cdot r_0=0.13090$, an aperture angle $\theta=12°$, a refractive index $n_0=1.60$ at the optical axis 1a of the rod lenses 1 (central refractive index), a radius $r_0=0.15$ mm of the effective lens portion). The constants a and c have the constant value $a=-68$ and $c=+1$. FIG. 15 shows the values of b as normalized values with bo indicating the b for m=1.5. It can be seen from FIG. 15 that b is almost constant even when m is varied. Moreover, as can be seen from FIGS. 13 and 14, the normalized values of d and e become smaller when m becomes large, so that the good image range shrinks.

Based on FIGS. 13 and 14, the constants d and e can be expressed by $$d/d_0 = 1.789 - 0.6063\, m + 0.06225\, m^2 \quad \text{(Eq. 61)}$$

and $$\log(e/e_0) = 0.2460 - 0.1669\, m + 0.00056\, m^2 \quad \text{(Eq. 62)}$$

wherein $d_0$ and $e_0$ are the d and e for m=1.50.

To sum up the results of ①, ② and ③, the constants a, b, c, d, and e, which govern the good image range for the refractive index distribution coefficients $h_4$ and $h_6$ for a radius $r_0=0.15$ mm of the effective lens portion, can be expressed using the dimensionless factor $g \cdot r_0$ and the overlapping degree m:

$$a = -10^{LA}$$

$$LA = 3.632 - 24.54(g \cdot r_0) + 102.4(g \cdot r_0)^2 - 172.8(g \cdot r_0)^3 \quad \text{(Eq. 63)}$$

$$b = 10^{LB}$$

$$LB = 3.729 - 28.78(g \cdot r_0) + 131.4(g \cdot r_0)^2 - 238.6(g \cdot r_0)^3 \quad \text{(Eq. 64)}$$

$$c = 1 \quad \text{(Eq. 65)}$$

$$d = 10^{LD} \cdot (1.789 - 0.6063\, m + 0.06225\, m^2)$$

$$LD = 2.216 - 18.01(g \cdot r_0) + 53.51(g \cdot r_0)^2 - 73.59(g \cdot r_0)^3 \quad \text{(Eq. 66)}$$

$$e = 10^{LE} \cdot 10^{LE2}$$

$$LE = 5.327 - 47.81(g \cdot r_0) + 197.7(g \cdot r_0)^2 - 334.2(g \cdot r_0)^3$$

$$LE2 = 0.2460 - 0.1669\, m + 0.00056\, m^2 \quad \text{(Eq. 67)}$$

If the radius $r_0$ of the effective lens portion of the rod lenses 1 takes a value other than 15 mm, the amount of image distortion resulting from all aberrations of the rod lenses 1 increases proportionally to $r_0$, so that the good image range for the refractive index distribution coefficients $h_4$ and $h_6$ defined by Eqs. 55, 56, and 63 to 67 generally describes the following ranges:

$r_0=0.05$ mm: MTF for a 72 line-pairs/mm pattern is greater than 50%

$r_0=0.30$ mm: MTF for a 12 line-pairs/mm pattern is greater than 50%

$r_0=0.60$ mm: MTF for a 6 line-pairs/mm pattern is greater than 50%

In this embodiment, it is preferable that a transparent substrate 5 with a parallel plane surface (cover glass) is arranged in a manner that the object plane 3 is located at the front focal position of the rod lens array 2, as shown in FIG. 16(a). With this configuration, the object plane 3 can be set at the front focal position just by pressing the manuscript to the surface of the transparent substrate 5. Moreover, it is preferable that the parallel plane transparent substrate (cover glass) 5 contacts the lens surface of the rod lens array 2, as shown in FIG. 16(b). This can be easily realized by adjusting the thickness of the transparent substrate (cover glass) 5. According to this embodiment, the adjustment of the distance between the rod lens array 2 and the front focal position can be simplified, which makes the assembly of the optical imaging system cheaper.

Moreover, in this embodiment, the good image range is defined by Eqs. 55 and 56, but an even better image range can be achieved by defining it with $$c - d/2 \leq h_4 \leq c + d/2 \quad \text{(Eq. 68)}$$

$$\{2(h_4 - c)/d\}^2 + [2\{h_6 - (a \cdot h_4 + b)\}/e]^2 \leq 1. \quad \text{(Eq. 69)}$$

Moreover, in this embodiment, the refractive index distribution of the rod lenses 1 is expressed by Eq. 51. However, it is not limited to such a distribution. For example, assuming that the secondary refractive distribution coefficient g, which governs the refractive power near the optical axis, stays the same, the refractive index distribution of the rod lenses 1 can be generally expressed by $$n(r)^2 = n_0^2 \cdot \{1 - (g \cdot r)^2 + f(r)\} \quad \text{(Eq. 70)}$$

wherein f(r) is a function of r.

Figure 17:
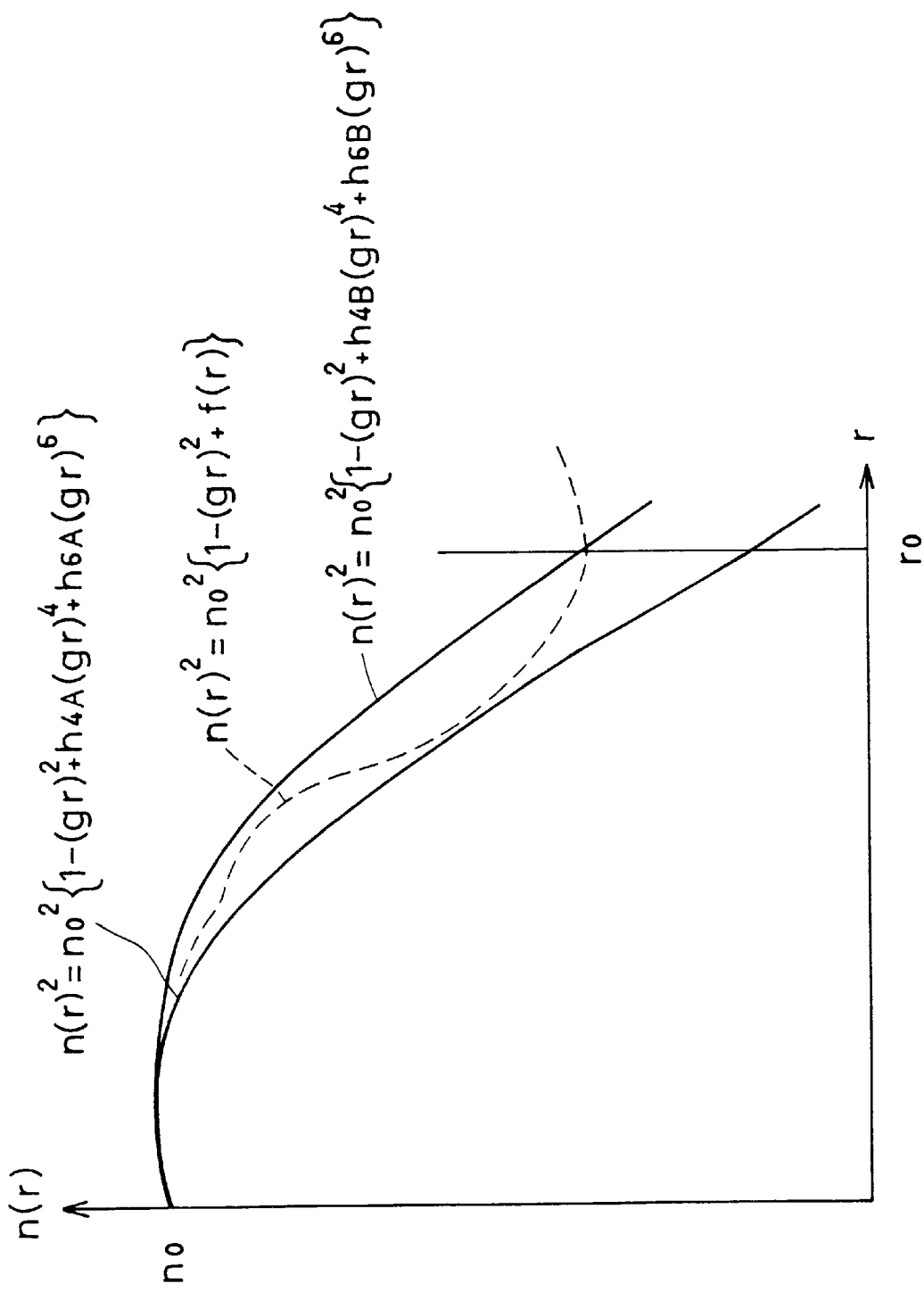
FIG. 17 illustrates another way of determining a good image range for the refractive index distribution coefficients $h_4$ and $h_6$ of the rod lenses used in the optical imaging system according to the first and the second embodiment of the present invention.

When the refractive index distribution can be expressed by the general Eq. 70, and f(r) satisfies $$h_{4A} \cdot (g \cdot r)^4 + h_{6A} \cdot (g \cdot r)^6 \leq f(r) \leq h_{4B} \cdot (g \cdot r)^4 + h_{6B} \cdot (g \cdot r)^6 \quad \text{(Eq. 71)}$$

for r in a range of $0 \leq r \leq r_0$ for two groups of refractive index distribution coefficients $(n_0, g, h_{4A}, h_{6A})$ and $(n_0, g, h_{4B}, h_{6B})$ that are in the ranges defined by Eqs. 55, 56, and 63 to 67, as shown in FIG. 17, then a "good image range" can be attained for the refractive index distribution.

Second Embodiment

Figure 18:
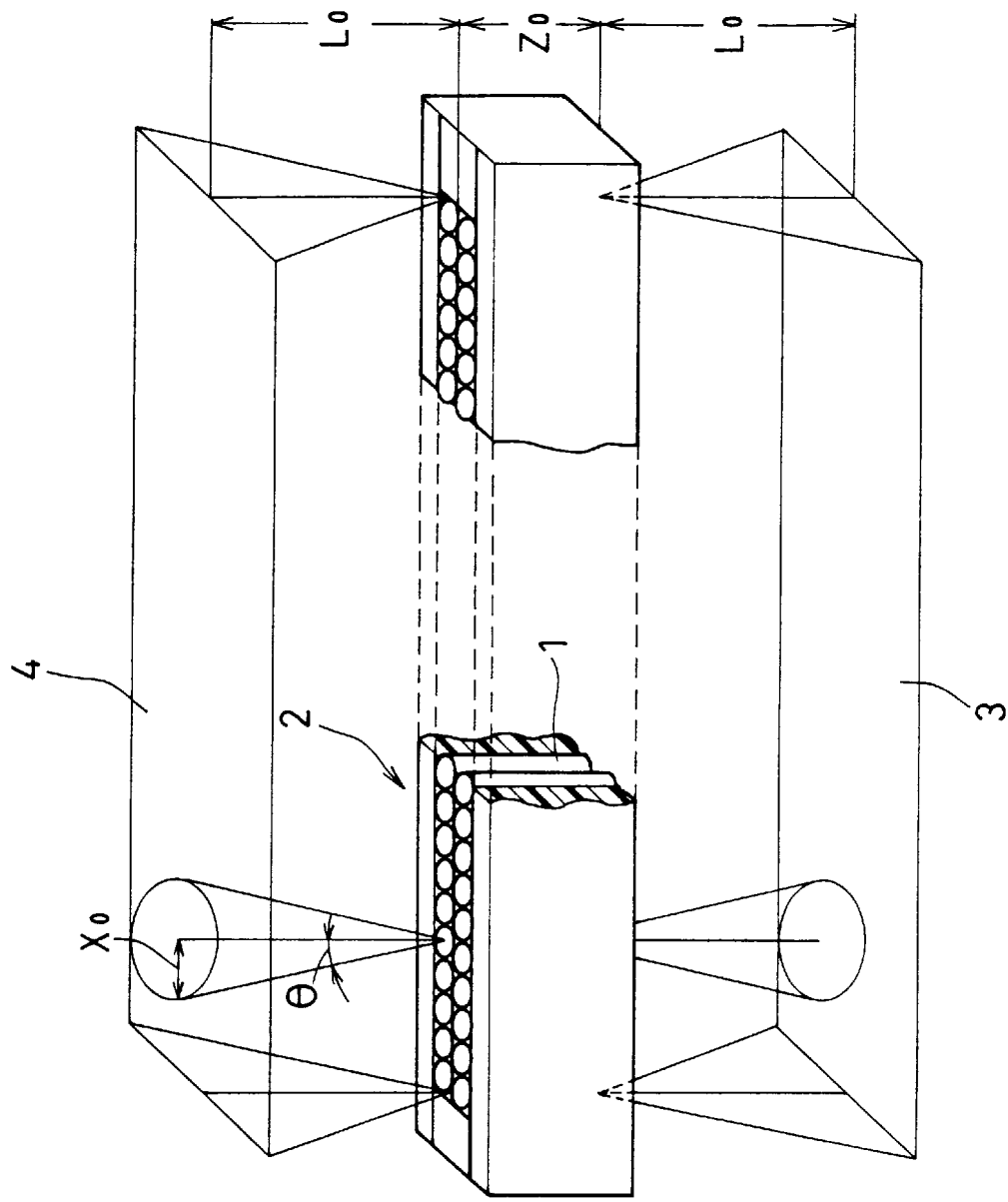
FIG. 18 is a perspective view of an optical imaging system according to the second embodiment of the present invention.

As is shown in FIGS. 1 and 18, in this embodiment, a plurality of acolumnar rod lenses 1 with a refractive index distribution in the radial direction are arranged in two rows in a rod lens array 2 for one-to-one imaging with their optical axes 1a in parallel. This optical imaging system focuses light from an object plane 3 onto an image plane 4, the planes being arranged on the two sides of the rod lens array 2.

As is shown in FIG. 3, the refractive index n of the rod lenses 1 underlies a distribution in the radial direction, which can be expressed by $$n(r)^2 = n_0^2 \cdot \{1 - (g \cdot r)^2 + h_4 \cdot (g \cdot r)^4 + h_6 \cdot (g \cdot r)^6\} \quad \text{(Eq. 72)}$$

wherein r is a radial distance from an optical axis 1a of the rod lenses 1, n(r) is the refractive index at the radial distance r from the optical axis 1a of the rod lens 1, $n_0$ is the refractive index at the optical axis 1a of the rod lenses 1 (center refractive index), and g, $h_4$ and $h_6$ are coefficients of the refractive index distribution.

To attain erected images as shown in FIG. 4, the ratio $Z_0/P$ of the length $Z_0$ of the rod lenses 1 and a one-pitch length $P = 2\pi/g$ of the rod lenses 1 has to be in the range $0.5 < Z_0/P < 1.0$.

The distance $L_0$ between the edge (rlens surface) of the rod lens array 2 and the object plane 3 and the distance $L_0$ between the edge (lens surface) of the rod lens array 2 and the imaging plane 4 (see FIG. 18) can be expressed by $$L_0 = -\{1/(n_0 g)\} \cdot \tan(Z_0 \pi / P). \quad \text{(Eq. 73)}$$

It is preferable that the radius $r_0$ of the effective rod lens portion, that is the radius of the rod lens 1 functioning as a lens is in a range of 0.05 mm $\leq r_0 \leq 0.60$ mm.

Lenses with a small $r_0$ can attain a high resolution more easily, because the amount of image distortion due to the various aberrations of the rod lenses 1 increases proportionally with the size of the entire lens. On the other hand, rod lenses 1 with an $r_0$ smaller than 0.05 mm are difficult to produce and to assemble. Also, when the radius $r_0$ of the effective rod lens portions in the rod lens array 2 is larger than 0.60 mm, the aberration becomes too large.

The realizable value $n_0$ for the refractive index at the optical axis 1a of the rod lenses 1 (center refractive index) depends on the material for the rod lenses (glass or synthetic resin) and is in the range of $1.4 \leq n_0 \leq 1.8$. The brightness of the rod lenses 1 depends on the dimensionless factor $g \cdot r_0$ or from the aperture angle indicating the range over which the lenses can accept light. The aperture angle $\theta$ (°) can be expressed by $$\theta = (n_0 \cdot g \cdot r_0)/(\pi/180). \tag{Eq. 74}$$

It is preferable that the dimensionless factor $g \cdot r_0$ is in the range $0.04 \leq g \cdot r_0 \leq 0.27$. If $g \cdot r_0$ is smaller than 0.04, the image becomes too dark and the time for scanning etc. becomes long. If $g \cdot r_0$ is larger than 0.27, the influence of the image curvature and the astigmatism becomes too large and the resolving power decreases.

The preferable range for $g \cdot r_0$, for example for a center refractive index of $n_0=1.60$, corresponds to about $4° \leq \theta \leq 24°$.

In an optical imaging system comprising such a rod lens array 2, a compound image is formed by the rod lenses 1 on the image plane 4, as is shown in FIG. 5, so that it is convenient to introduce a dimensionless factor describing the amount of overlap, that is, the so-called "overlapping degree". This overlapping degree m can be expressed as $$m = X_0/2r_0 \tag{Eq. 75}$$

wherein $X_0$ is the image radius (field of view) that a single rod lens 1 projects onto the image plane 4, which is defined as $X_0 = -r_0/\cos(Z_0 \pi/P)$.

It is preferable that the overlapping degree m of the rod lens array 2 is in the range $1.0 \leq m \leq 5.0$. If the overlapping degree m is larger than 5.0, the image becomes too dark and the time for scanning etc. becomes long. If the overlapping degree m is smaller than 1.0, periodical irregularities appear in the brightness of the image plane 4.

It is very desirable to match the distance 2R between the optical axes of neighboring rod lenses 1 with 2 $r_0$ (diameter of the effective lens portion of the rod lenses 1), since then the largest amount of light can be focused on the image. However, since the refractive index distribution at the peripheral portion of the rod lenses 1 can differ considerably from the designed value, this portion can often not be used for the lens. Also, sometimes the lenses comprise a light-absorbing layer to prevent stray light due to total reflection at the lens side surface. Moreover, depending on the conditions for assembling the rod lens array 2, sometimes the rod lenses 1 are arranged with a certain distance between each other. Considering the above circumstances, the ratio $r_0/R$ is set in the range of $0.5 \leq r_0/R \leq 1.0$.

When developing the present invention, the inventors took the standard for "high resolution" to mean "a value of at least 50% for the MTF of a 24 line-pairs/mm pattern on a center line of a rod lens array 2 comprising a plurality of rod lenses 1, which have an effective lens portion radius $r_0$ of 0.15 mm and are arranged in two rows so that their optical axes 1a are parallel", and determined the refractive index distribution coefficients $h_4$ and $h_6$ that fulfill this standard.

Figure 19:
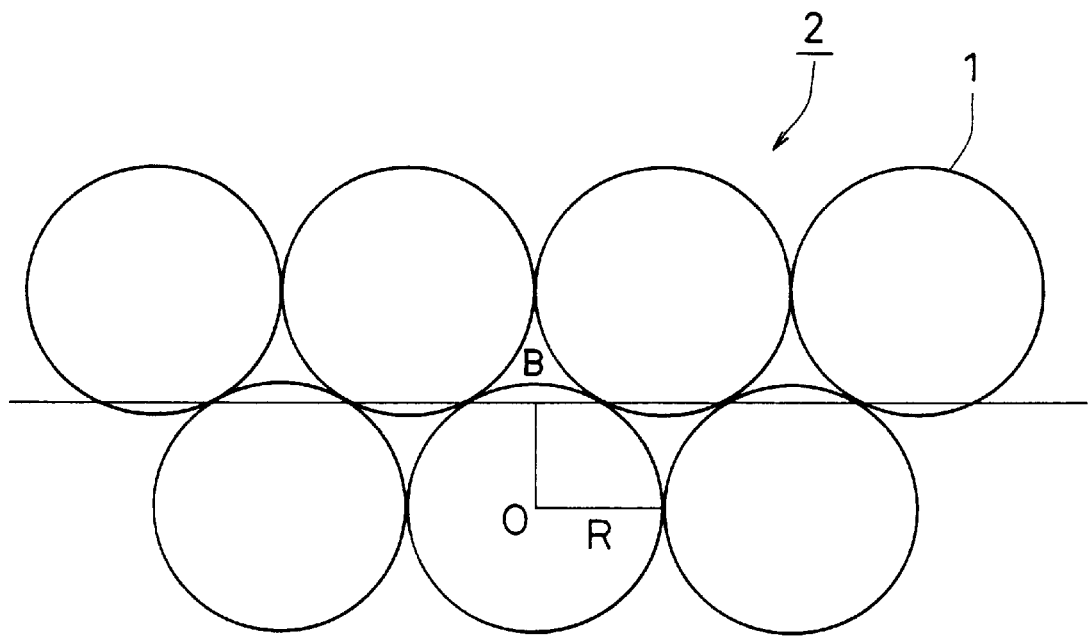
FIG. 19 is a schematic drawing illustrating the measurement point of the MTF values for the optical imaging system according to the second embodiment of the present invention.
Figure 20:
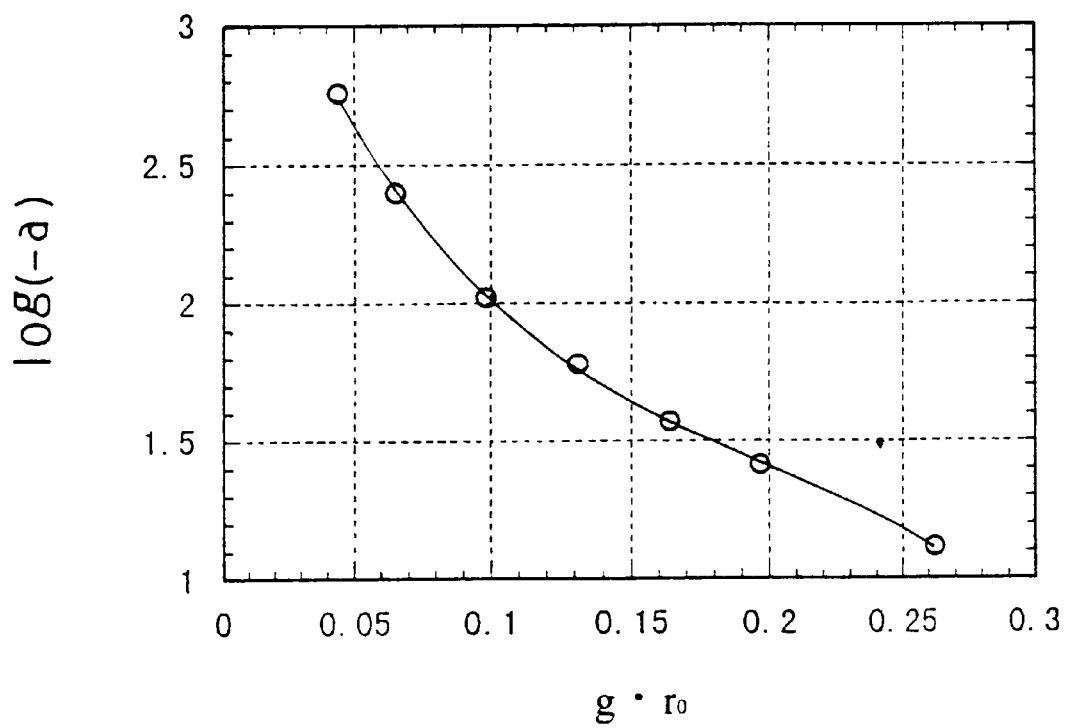
FIG. 20 illustrates the dependency of the constant a, which governs the good image range for the refractive index distribution coefficients $h_4$ and $h_6$ of the rod lenses used in the optical imaging system according to the second embodiment of the present invention, upon the dimensionless factor $g \cdot r_0$.
Figure 21:
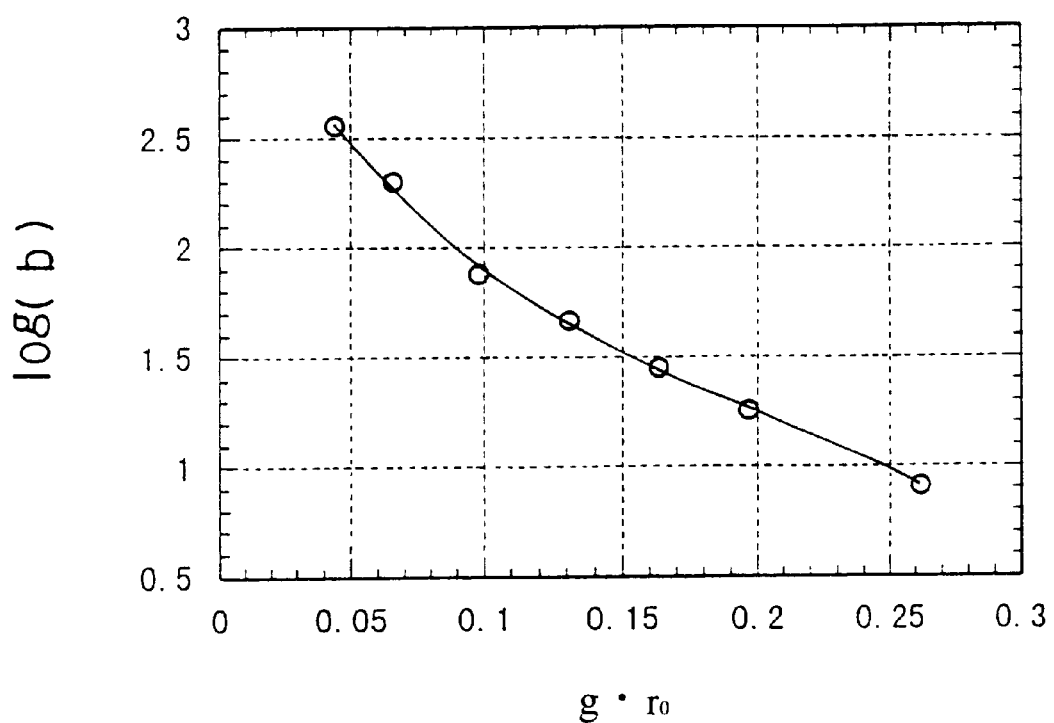
FIG. 21 illustrates the dependency of the constant b, which governs the good image range for the refractive index distribution coefficients $h_4$ and $h_6$ of the rod lenses used in the optical imaging system according to the second embodiment of the present invention, upon the dimensionless factor $g \cdot r_0$.
Figure 22:
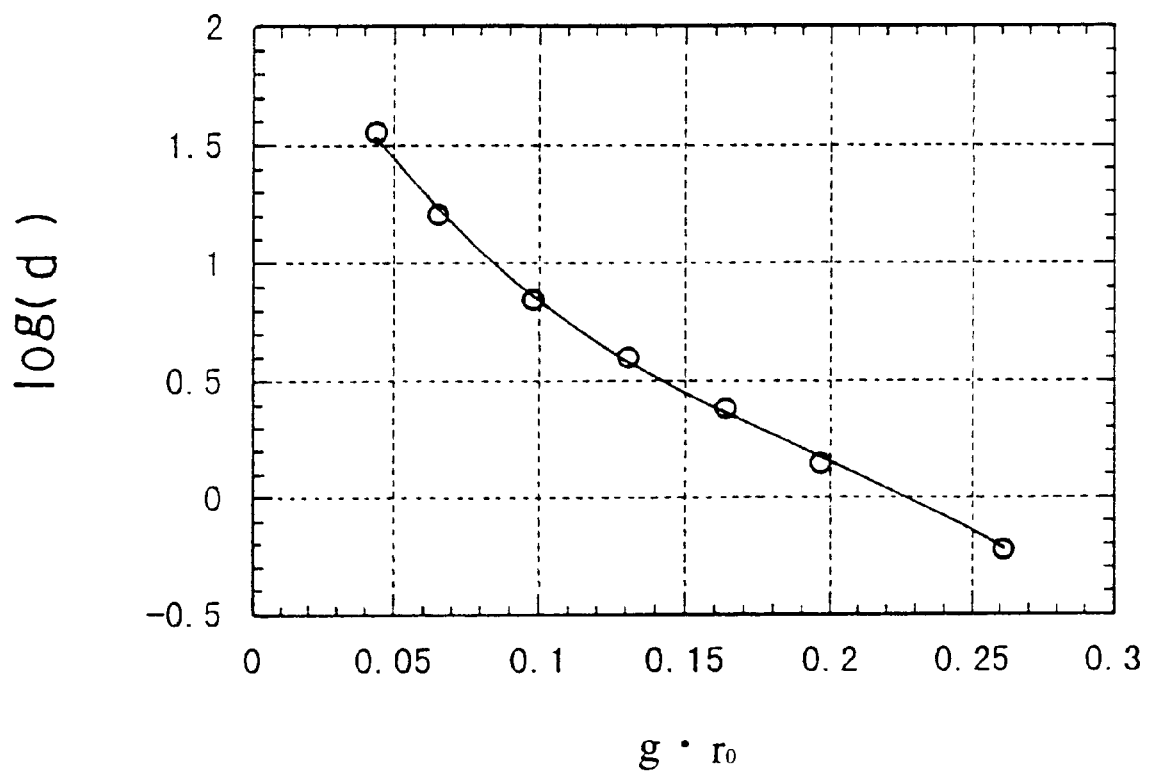
FIG. 22 illustrates the dependency of the constant d, which governs the good image range for the refractive index distribution coefficients $h_4$ and $h_6$ of the rod lenses used in the optical imaging system according to the second embodiment of the present invention, upon the dimensionless factor $g \cdot r_0$.
Figure 23:
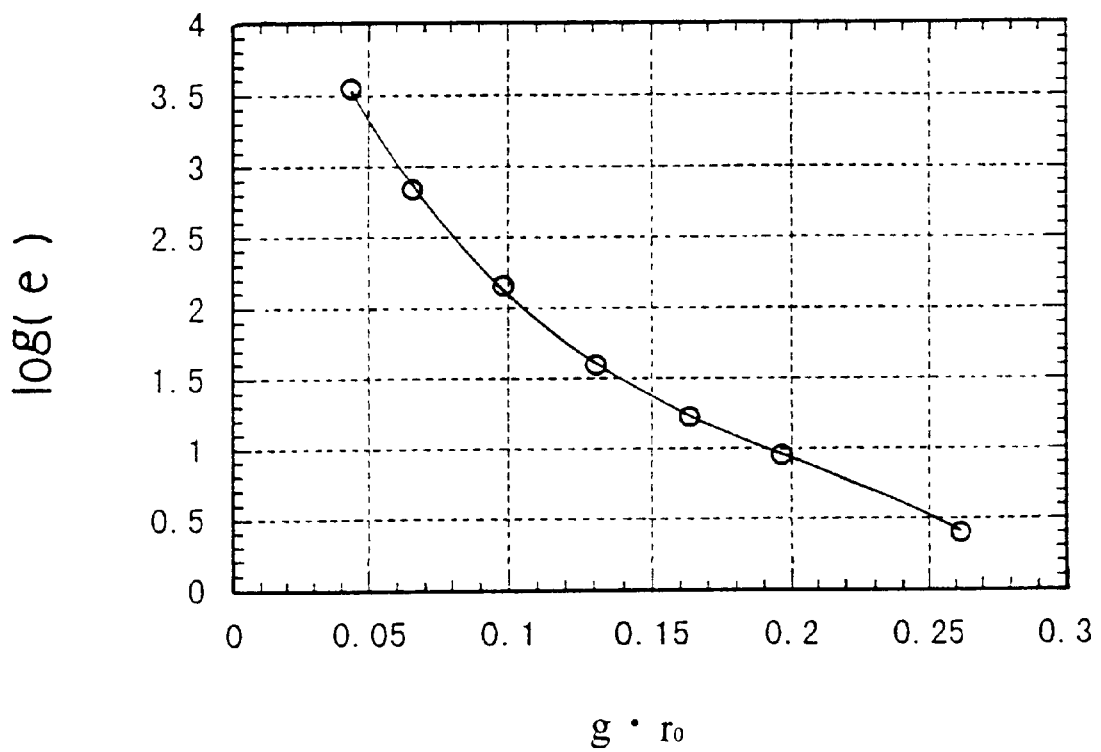
FIG. 23 illustrates the dependency of the constant e, which governs the good image range for the refractive index distribution coefficients $h_4$ and $h_6$ of the rod lenses used in the optical imaging system according to the second embodiment of the present invention, upon the dimensionless factor $g \cdot r_0$.

To be specific, a rod lens array 2 with the above configuration was designed. Ray tracing was performed taking the perpendicular projection of a point B as indicated in FIG. 19 onto the object plane for the light source. The MTF values of a 24 line-pairs/mm pattern were calculated for the X direction and for the Y direction, and the smaller value was taken as the MTF value for the rod lens array 2. The optical design software "Oslo Six" by Sinclair Optics (US) was used for the ray tracing. Then, for a rod lens array 2 with parameters as shown in Table 1, a range of the refractive index distribution coefficients $h_4$ and $h_6$ for which the MTF value of a 24 line-pairs/mm pattern is at least 50% was determined. This range is called "good image range" of the refractive index distribution coefficients $h_4$ and $h_6$ below.

Under any of the conditions shown in Table 1, the good image range can be drawn as a narrow ellipse in a Cartesian coordinate system having $h_4$ as the X-axis and $h_6$ as the Y-axis, as shown in FIG. 7. This good image range can be expressed by $$c - d \leq h_4 \leq c + d \tag{Eq. 76}$$

$$\{(h_4-c)/d\}^2 + [\{h_6-(a \cdot h_4+b)\}/e]^2 \leq 1 \tag{Eq. 77}$$

wherein a is the slope of the central axis, b is the intercept of the central axis with the $h_6$-axis, c is the $h_4$-coordinate of the center of the central axis, d is the half width of the range spanned by the ellipse in the $h_4$-direction, e is the half width of the ellipse in the $h_6$-direction at its central $h_4$-value.

The following is a discussion of how changes of the dimensionless factor $g \cdot r_0$, the refractive index $n_0$ at the optical axis 1a of the rod lenses 1 (central refractive index), and the overlapping degree m influence these constants a, b, c, d, and e.

④ Influence of a Change of $g \cdot r_0$

FIGS. 20 to 23 show the dependency of the constants a, b, c, d and e upon the dimensionless factor $g \cdot r_0$ under the conditions A1–A7 in Table 1 (i.e., the refractive index $n_0=1.60$ at the optical axis 1a of the rod lenses 1 (central refractive index), a radius $r_0=0.15$ mm of the effective lens portion, and an overlapping degree m=1.50). The constant c has the constant value 1.

From FIGS. 20 to 23, the constants a, b, d, and e can be expressed as polynomials of the dimensionless factor $g \cdot r_0$:

$$\log(-a) = 3.6631 - 25.192(g \cdot r_0) + 103.73(g \cdot r_0)^2 - 170.81(g \cdot r_0)^3 \tag{Eq. 78}$$

$$\log(b) = 3.3489 - 21.092(g \cdot r_0) + 78.535(g \cdot r_0)^2 - 128.31(g \cdot r_0)^3 \tag{Eq. 79}$$

$$\log(d) = 2.358 - 22.161(g \cdot r_0) + 84.009(g \cdot r_0)^2 - 141.6(g \cdot r_0)^3 \tag{Eq. 80}$$

$$\log(e) = 5.3197 - 48.816(g \cdot r_0) + 197.65(g \cdot r_0)^2 - 317.05(g \cdot r_0)^3 \tag{Eq. 81}$$

In Eqs. 78 to 81, "log" means the common logarithm with a base of 10.

⑤ Influence of a Change of $n_0$

Figure 24:
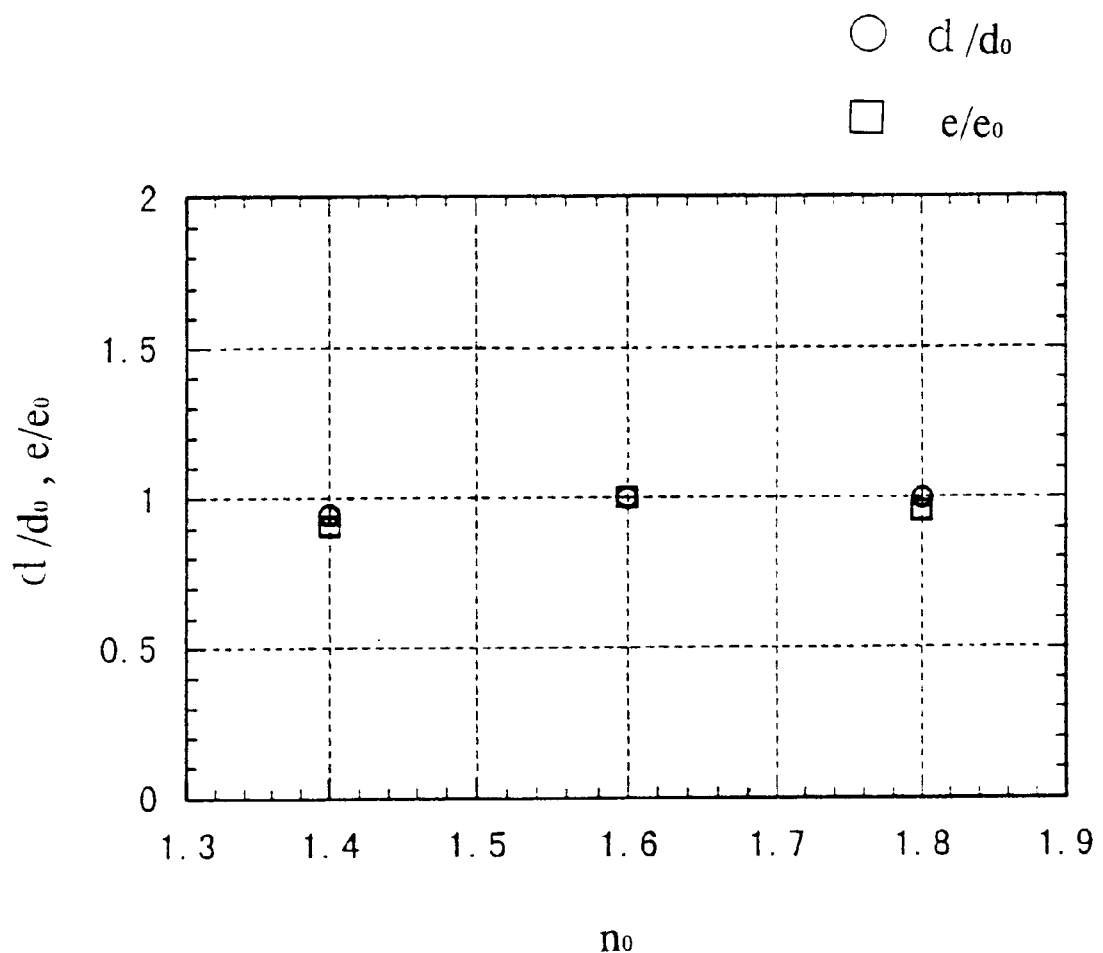
FIG. 24 illustrates the dependency of the constants d and e, which govern the good image range for the refractive index distribution coefficients $h_4$ and $h_6$ of the rod lenses used in the optical imaging system according to the second embodiment of the present invention, upon the refractive index $n_0$ at the optical axis of the rod lenses.

FIG. 24 shows the dependency of the constants d and e on the refractive index $n_0$ at the optical axis 1a of the rod lenses 1 (central refractive index) under the conditions B1–B3 in Table 1 (i.e., a dimensionless factor $g \cdot r_0=0.13090$, a radius $r_0=0.15$ mm of the effective lens portion, and an overlapping degree m=1.50). The constants a, b, and c had the constant values a=−60, b=+46, c=+1. FIG. 24 shows the values of d and e as normalized values with $d_0$ and $e_0$ indicating the d and e for $n_0=1.6$. It can be seen from FIG. 24 that d and e are constant even when $n_0$ is varied.

⑥ Influence of a Change of m

Figure 25:
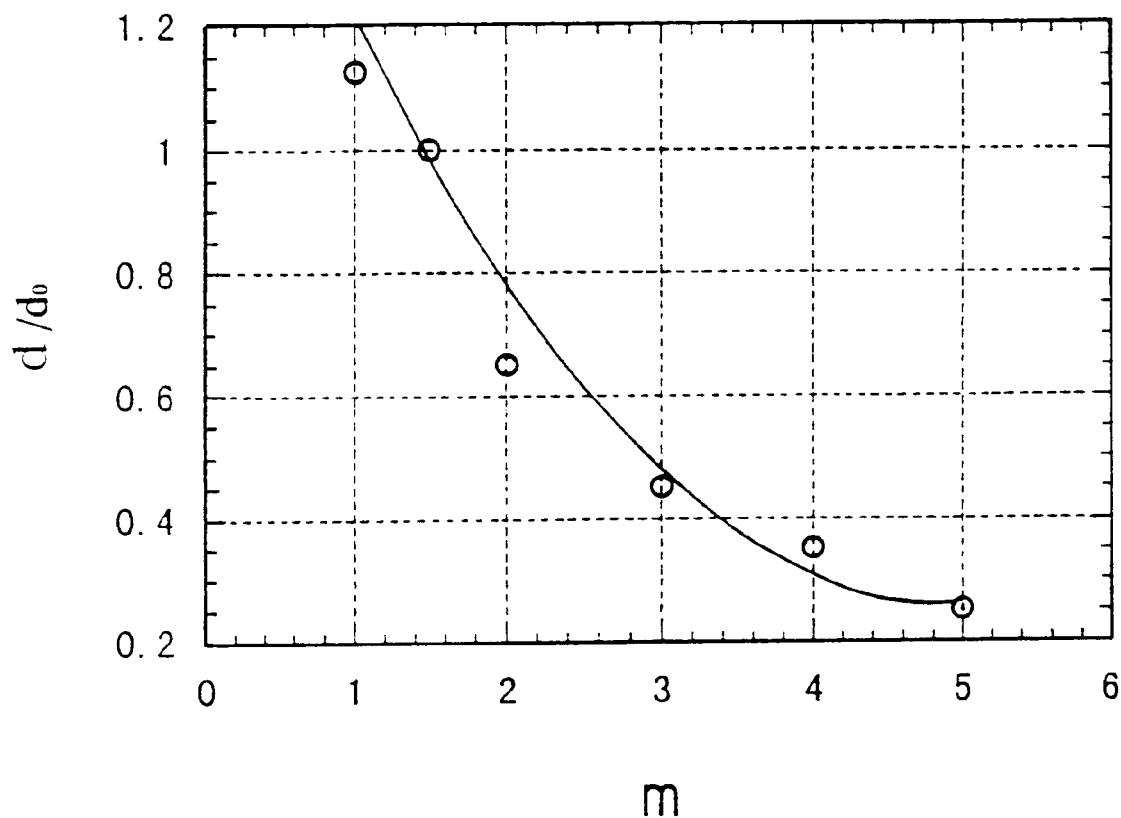
FIG. 25 illustrates the dependency of the constant d, which governs the good image range for the refractive index distribution coefficients $h_4$ and $h_6$ of the rod lenses used in the optical imaging system according to the second embodiment of the present invention, upon the overlapping degree m.
Figure 26:
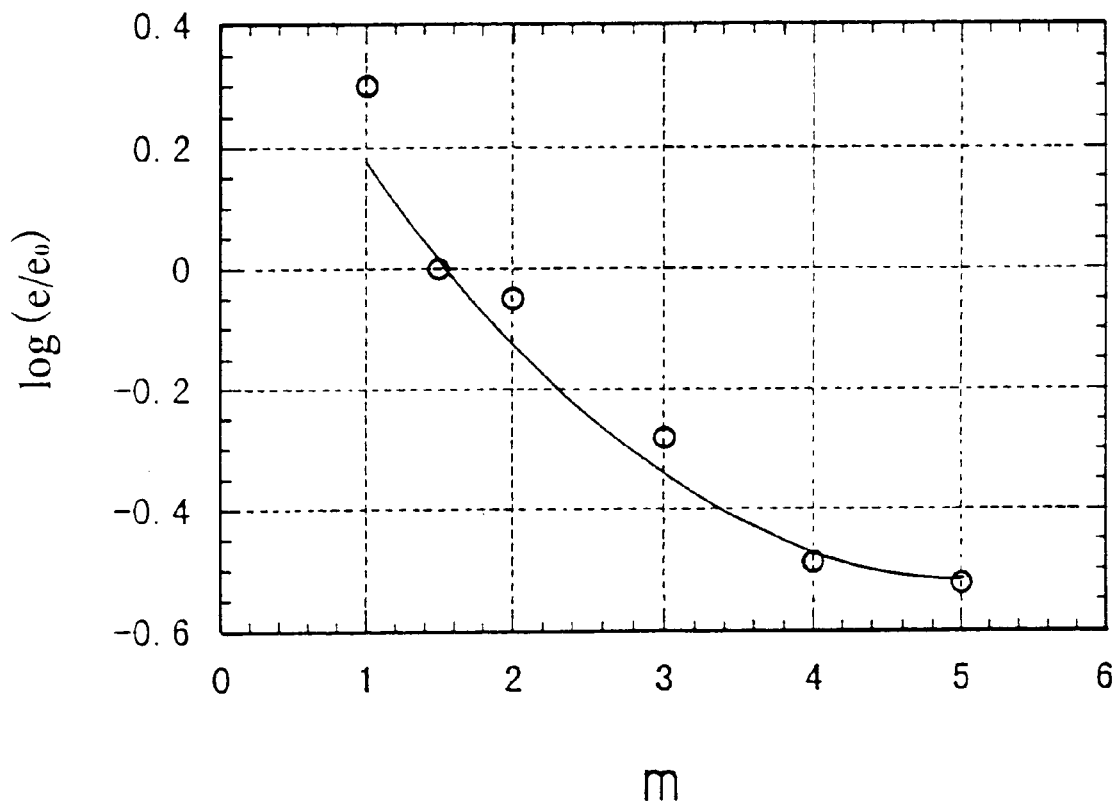
FIG. 26 illustrates the dependency of the constant e, which governs the good image range for the refractive index distribution coefficients $h_4$ and $h_6$ of the rod lenses used in the optical imaging system according to the second embodiment of the present invention, upon the overlapping degree m.
Figure 27:
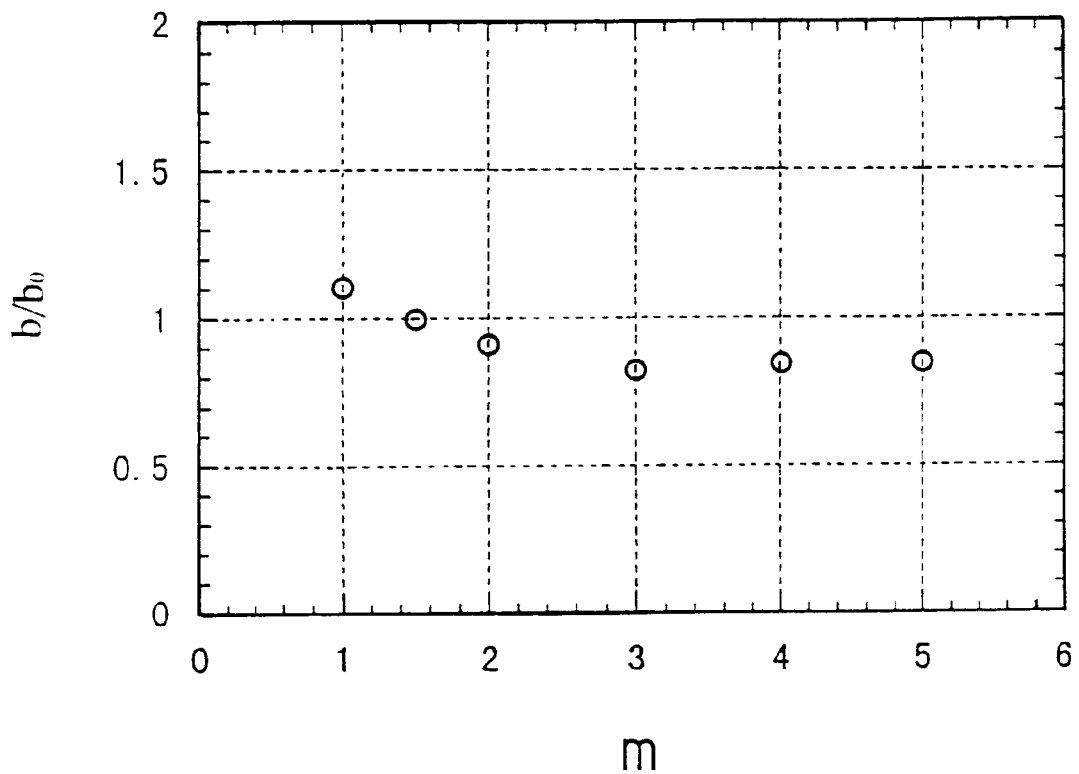
FIG. 27 illustrates the dependency of the constant b, which governs the good image range for the refractive index distribution coefficients $h_4$ and $h_6$ of the rod lenses used in the optical imaging system according to the second embodiment of the present invention, upon the overlapping degree m.

FIGS. 25 and 26 show the dependency of the constants d and e on the overlapping degree m under the conditions C1–C6 in Table 1 (i.e., a dimensionless factor $g \cdot r_0 = 0.13090$, an aperture angle $\theta = 12°$, a refractive index $n_0 = 1.60$ at the optical axis 1a of the rod lenses 1 (central refractive index), a radius $r_0 = 0.15$ mm of the effective lens portion). The constants a and c have the constant value $a = -60$ and $c = +1$. FIG. 27 shows the values of b as normalized values with $b_0$ indicating the b for $m = 1.5$. It can be seen from FIG. 27 that b is almost constant even when m is varied. Moreover, as can be seen from FIGS. 25 and 26, the normalized values of d and e become smaller when m becomes large, so that the good image range shrinks.

Based on FIGS. 25 and 26, the constants d and e can be expressed by $$d/d_0 = 1.7805 - 0.6275\, m - 0.064757\, m^2 \qquad \text{(Eq. 82)}$$

and $$\log(e/e_0) = 0.56302 - 0.42878\, m + 0.042574\, m^2 \qquad \text{(Eq. 83)}$$

wherein $d_0$ and $e_0$ are the d and e for $m = 1.50$.

To sum up the results of ④, ⑤ and ⑥, the constants a, b, c, d, and e, which govern the good image range for the refractive index distribution coefficients $h_4$ and $h_6$ for a radius $r_0 = 0.15$ mm of the effective lens portion, can be expressed using the dimensionless factor $g \cdot r_0$ and the overlapping degree m:

$$a = -10^{LA}$$

$$LA = 3.6631 - 25.192(g \cdot r_0) + 103.73(g \cdot r_0)^2 - 170.81(g \cdot r_0)^3 \qquad \text{(Eq. 84)}$$

$$b = 10^{LB}$$

$$LB = 3.3489 - 21.092(g \cdot r_0) + 78.535(g \cdot r_0)^2 - 128.31(g \cdot r_0)^3 \qquad \text{(Eq. 85)}$$

$$c = 1 \qquad \text{(Eq. 86)}$$

$$d = 10^{LD} \cdot (1.7805 - 0.6275\, m - 0.064757\, m^2)$$

$$LD = 2.358 - 22.161(g \cdot r_0) + 84.009(g \cdot r_0)^2 - 141.6(g \cdot r_0)^3 \qquad \text{(Eq. 87)}$$

$$e = 10^{LE} \cdot 10^{LE2}$$

$$LE = 5.3197 - 48.816(g \cdot r_0) + 197.65(g \cdot r_0)^2 - 317.05(g \cdot r_0)^3$$

$$LE2 = 0.56302 - 0.42878\, m + 0.042574\, m^2 \qquad \text{(Eq. 88)}$$

If the radius $r_0$ of the effective lens portion of the rod lenses 1 takes a value other than 15 mm, the amount of image distortion resulting from all aberrations of the rod lenses 1 increases proportionally to $r_0$, so that the good image range for the refractive index distribution coefficients $h_4$ and $h_6$ defined by Eqs. 76, 77, and 84 to 88 generally describes the following ranges:

$r_0 = 0.05$ mm: MTF for a 72 line-pairs/mm pattern is greater than 50%

$r_0 = 0.30$ mm: MTF for a 12 line-pairs/mm pattern is greater than 50%

$r_0 = 0.60$ mm: MTF for a 6 line-pairs/mm pattern is greater than 50%

Figure 16:
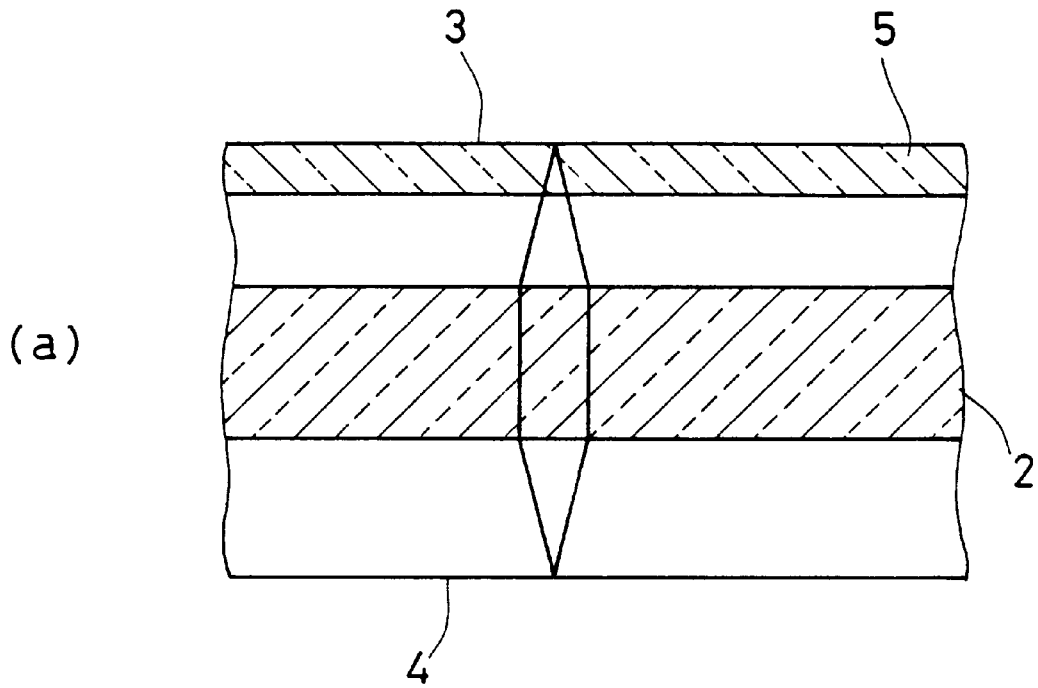
FIG. 16 is a sectional drawing of an optical imaging device comprising a parallel plane transparent substrate, in accordance with the first and the second embodiment of the present invention.
Figure 16:
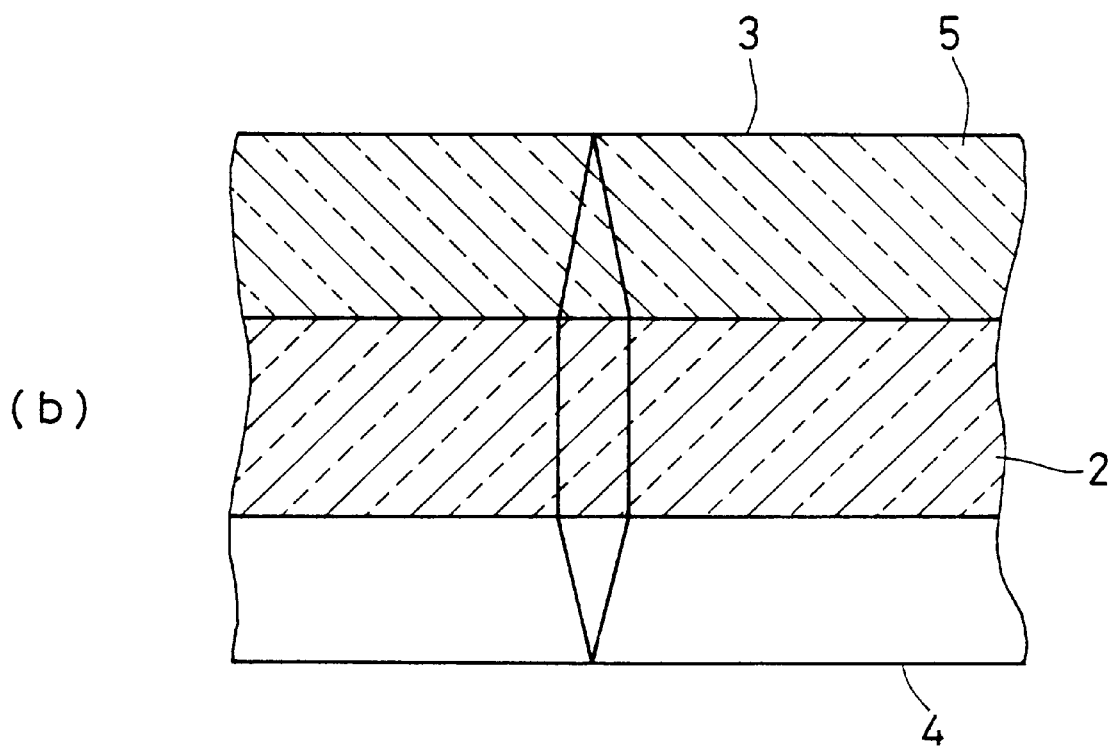

In this embodiment, it is preferable that a transparent substrate (cover glass) 5 with a parallel plane surface is arranged in a manner that the object plane 3 is located at the front focal position of the rod lens array 2, as shown in FIG. 16(*a*). With this configuration, the object plane 3 can be set at the front focal position just by pressing the manuscript to the surface of the transparent substrate 5. Moreover, it is preferable that the parallel plane transparent substrate (cover glass) 5 contacts the lens surface of the rod lens array 2, as shown in FIG. 16(*b*). This can be easily realized by adjusting the thickness of the transparent substrate (cover glass) 5. According to this embodiment, the adjustment of the distance between the rod lens array 2 and the front focal position can be simplified, which makes the assembly of the optical imaging system cheaper.

Moreover, in this embodiment, the good image range is defined by Eqs. 76 and 77, but an even better image range can be achieved by defining it with $$c - d/2 \leq h_4 \leq c + d/2 \qquad \text{(Eq. 89)}$$

$$\{2(h_4 - c)/d\}^2 + [2\{h_6 - (a \cdot h_4 + b)\}/e]^2 \leq 1. \qquad \text{(Eq. 90)}$$

Moreover, in this embodiment, the refractive index distribution of the rod lenses 1 is expressed by Eq. 72. However, it is not limited to such a distribution. For example, assuming that the secondary refractive distribution coefficient g, which governs the refractive power near the optical axis, stays the same, the refractive index distribution of the rod lenses 1 can be generally expressed by $$n(r)^2 = n_0^2 \cdot \{1 - (g \cdot r)^2 + f(r)\} \qquad \text{(Eq. 91)}$$

wherein $f(r)$ is a function of r.

When the refractive index distribution can be expressed by the general Eq. 91, and $f(r)$ satisfies $$h_{4A} \cdot (g \cdot r)^4 + h_{6A} \cdot (g \cdot r)^6 \leq f(r) \leq h_{4B} \cdot (g \cdot r)^4 + h_{6B} \cdot (g \cdot r)^6 \qquad \text{(Eq. 92)}$$

in a range of $0 \leq r \leq r_0$ for two groups of refractive index distribution coefficients $(n_0, g, h_{4A}, h_{6A})$ and $(n_0, g, h_{4B}, h_{6B})$ that are in the ranges defined by Eqs. 76, 77, and 84 to 88, as shown in FIG. 17, then a "good image range" can be attained for the refractive index distribution.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. An optical imaging system for focusing light from an object plane onto an image plane, comprising:

a rod lens array having a plurality of rod lenses with a refractive index distribution in a radial direction that are arranged in one row so that their optical axes are parallel;

wherein the refractive index distribution of said rod lenses can be expressed by $$n(r)^2 = n_0^2 \cdot \{1 - (g \cdot r)^2 + h_4 \cdot (g \cdot r)^4 + h_6 \cdot (g \cdot r)^6\} \qquad \text{(Eq. 1)}$$

wherein r is a radial distance from an optical axis of said rod lenses, $n_0$ is a refractive index at the optical axis of said rod lenses, and g, $h_4$ and $h_6$ are coefficients of the refractive index distribution;

constants a, b, c, d, and e are given by $$a = -10^{LA}$$

$$LA = 3.632 - 24.54(g \cdot r_0) + 102.4(g \cdot r_0)^2 - 172.8(g \cdot r_0)^3 \qquad \text{(Eq. 2)}$$

$$b = 10^{LB}$$

$$LB = 3.729 - 28.78(g \cdot r_0) + 131.4(g \cdot r_0)^2 - 238.6(g \cdot r_0)^3 \qquad \text{(Eq. 3)}$$

$$c = 1 \qquad \text{(Eq. 4)}$$

$$d = 10^{LD} \cdot (1.789 - 0.6063\, m + 0.06225\, m^2)$$

$$LD=2.216-18.01(g \cdot r_0)+53.51(g \cdot r_0)^2-73.59(g \cdot r_0)^3 \quad \text{(Eq. 5)}$$

$$e=10^{LE} \cdot 10^{LE2}$$

$$LE=5.327-47.81(g \cdot r_0)+197.7(g \cdot r_0)^2-334.2(g \cdot r_0)^3$$

$$LE2=0.2460-0.1669\ m+0.00056\ m^2 \quad \text{(Eq. 6)}$$

wherein $r_0$ is a radius of a portion of said rod lenses functioning as a lens, and m is an overlapping degree; and the refractive index distribution coefficients $h_4$ and $h_6$ are in ranges defined by $$c-d \leq h_4 \leq c+d \quad \text{(Eq. 7)}$$

$$\{(h_4-c)/d\}^2+[\{h_6-(a \cdot h_4+b)\}/e]^2 \leq 1. \quad \text{(Eq. 8)}$$

2. The optical imaging system of claim 1, wherein the refractive distribution coefficients $h_4$ and $h_6$ are in ranges defined by $$c-d/2 \leq h_4 \leq c+d/2 \quad \text{(Eq. 9)}$$

$$\{2(h_4-c)/d\}^2+[2\{h_6-(a \cdot h_4+b)\}/e]^2 \leq 1. \quad \text{(Eq. 10)}$$

3. The optical imaging system of claim 1, wherein the refractive index $n_0$ at the optical axis of the rod lenses is in a range of $1.4 \leq n_0 \leq 1.8$.

4. The optical imaging system of claim 1, wherein a product $g \cdot r_0$ of the refractive index distribution coefficient g and the radius $r_0$ of the portion of said rod lenses functioning as a lens is in a range of $0.04 \leq g \cdot r_0 \leq 0.27$.

5. The optical imaging system of claim 1, wherein the refractive index distribution of the rod lenses is given by $$n(r)^2=n_0^2 \cdot \{1-(g \cdot r)^2+f(r)\} \quad \text{(Eq. 11)}$$

wherein f(r) is a function of r that satisfies $$h_{4A} \cdot (g \cdot r)^4+h_{6A} \cdot (g \cdot r)^6 \leq f(r) \leq h_{4B} \cdot (g \cdot r)^4+h_{6B} \cdot (g \cdot r)^6 \quad \text{(Eq. 12)}$$

for r in a range of $0 \leq r \leq r_0$ ($r_0$: radius of the portion of said rod lenses functioning as a lens) for two groups of refractive index distribution coefficients ($n_0$, g, $h_{4A}$, $h_{6A}$) and ($n_0$, g, $h_{4B}$, $h_{6B}$) that are in the ranges defined by Eq. 2–Eq. 8.

6. The optical imaging system of claim 1, wherein the radius $r_0$ of the portion of said rod lenses functioning as a lens is in a range of $0.05\ \text{mm} \leq r_0 \leq 0.60\ \text{mm}$.

7. The optical imaging system of claim 1, wherein $r_0/R$ is in the range $0.5 \leq r_0/R \leq 1.0$, wherein $r_0$ is the radius of the portion of said rod lenses functioning as a lens and 2R is a distance between the optical axis of two neighboring rod lenses.

8. The optical imaging system of claim 1, wherein $Z_0/P$ is in the range $0.5<Z_0/P<1.0$, wherein $Z_0$ is a length of a rod lens and $P=2\pi/g$ is a one-pitch length of said rod lenses.

9. The optical imaging system of claim 1, wherein the overlapping degree m that is defined as $m=X_0/2r_0$, wherein $X_0$ is an image radius that said rod lenses project onto the image plane and $r_0$ is the radius of the portion of said rod lenses functioning as a lens, is in a range of $1.0 \leq m \leq 5.0$.

10. The optical imaging system of claim 1, wherein a parallel plane transparent substrate is arranged so that the object plane is positioned at a front focal position of the rod lens array.

11. The optical imaging system of claim 10, wherein the parallel plane substrate contacts lens surfaces of the rod lens array.

12. An optical imaging system for focusing light from an object plane onto an image plane, comprising:

a rod lens array having a plurality of rod lenses with a refractive index distribution in a radial direction that are arranged in two rows so that their optical axes are parallel;

wherein the refractive index distribution of said rod lenses can be expressed by $$n(r)^2=n_0^2 \cdot \{1-(g \cdot r)^2+h_4 \cdot (g \cdot r)^4+h_6 \cdot (g \cdot r)^6\} \quad \text{(Eq. 13)}$$

wherein r is a radial distance from an optical axis of said rod lenses, $n_0$ is a refractive index at the optical axis of said rod lenses, and g, $h_4$ and $h_6$ are coefficients of the refractive index distribution;

constants a, b, c, d, and e are given by $$a=-10^{LA}$$

$$LA=3.6631-25.192(g \cdot r_0)+103.73(g \cdot r_0)^2-170.81(g \cdot r_0)^3 \quad \text{(Eq. 14)}$$

$$b=10^{LB}$$

$$LB=3.3489-21.092(g \cdot r_0)+78.535(g \cdot r_0)^2-128.31(g \cdot r_0)^3 \quad \text{(Eq. 15)}$$

$$c=1 \quad \text{(Eq. 16)}$$

$$d=10^{LD} \cdot (1.7805-0.6275\ m-0.064757\ m^2)$$

$$LD=2.358-22.161(g \cdot r_0)+84.009(g \cdot r_0)^2-141.6(g \cdot r_0)^3 \quad \text{(Eq. 17)}$$

$$e=10^{LE} \cdot 10^{LE2}$$

$$LE=5.3197-48.816(g \cdot r_0)+197.65(g \cdot r_0)^2-317.05(g \cdot r_0)^3$$

$$LE2=0.56302-0.42878\ m+0.042574\ m^2 \quad \text{(Eq. 18)}$$

wherein $r_0$ is a radius of a portion of said rod lenses functioning as a lens, and m is the overlapping degree; and the refractive index distribution coefficients $h_4$ and $h_6$ are in the ranges defined by $$c-d \leq h_4 \leq c+d \quad \text{(Eq. 19)}$$

and $$\{(h_4-c)/d\}^2+[\{h_6-(a \cdot h_4+b)\}/e]^2 \leq 1. \quad \text{(Eq. 20)}$$

13. The optical imaging system of claim 12, wherein the refractive distribution coefficients $h_4$ and $h_6$ are in the ranges defined by $$c-d/2 \leq h_4 \leq c+d/2 \quad \text{(Eq. 21)}$$

$$\{2(h_4-c)/d\}^2+[2\{h_6-(a \cdot h_4+b)\}/e]^2 \leq 1. \quad \text{(Eq. 22)}$$

14. The optical imaging system of claim 12, wherein the refractive index $n_0$ at the optical axis of the rod lenses is in a range of $1.4 \leq n_0 \leq 1.8$.

15. The optical imaging system of claim 12, wherein a product $g \cdot r_0$ of the refractive index distribution coefficient g and the radius $r_0$ of the portion functioning as a lens is in a range of $0.04 \leq g \cdot r_0 \leq 0.27$.

16. The optical imaging system of claim 12, wherein the refractive index distribution of the rod lenses is given by $$n(r)^2=n_0^2 \cdot \{1-(g \cdot r)^2+f(r)\} \quad \text{(Eq. 23)}$$

wherein f(r) is a function of r that satisfies $$h_{4A} \cdot (g \cdot r)^4+h_{6A} \cdot (g \cdot r)^6 \leq f(r) \leq h_{4B} \cdot (g \cdot r)^4+h_{6B} \cdot (g \cdot r)^6 \quad \text{(Eq. 24)}$$

for r in a range of $0 \leq r \leq r_0$ ($r_0$: radius of the portion of said rod lenses functioning as a lens) for two groups of refractive index distribution coefficients ($n_0$, g, $h_{4A}$, $h_{6A}$) and ($n_0$, g, $h_{4B}$, $h_{6B}$) that are in the ranges defined by Eq. 14–Eq. 20.

17. The optical imaging system of claim 12, wherein the radius $r_0$ of the portion of said rod lenses functioning as a lens is in a range of 0.05 mm$\leq r_0 \leq$0.60 mm.

18. The optical imaging system of claim 12, wherein $r_0/R$ is in the range $0.5 \leq r_0/R \leq 1.0$, wherein $r_0$ is the radius of the portion of said rod lenses functioning as a lens and 2R is a distance between the optical axis of two neighboring rod lenses.

19. The optical imaging system of claim 12, wherein $Z_0/P$ is in the range $0.5 < Z_0/P < 1.0$, wherein $Z_0$ is a length of a rod lens and $P = 2\pi/g$ is a one-pitch length of said rod lenses.

20. The optical imaging system of claim 12, wherein the overlapping degree m that is defined as $m = X_0/2r_0$, wherein $X_0$ is an image radius that said rod lenses project onto the image plane and $r_0$ is the radius of the portion of said rod lenses functioning as a lens, is in a range of $1.0 \leq m \leq 5.0$.

21. The optical imaging system of claim 12, wherein a parallel plane ransparent substrate is arranged so that the object plane is positioned at a front focal position of the rod lens array.

22. The optical imaging system of claim 21, wherein the parallel plane substrate contacts lens surfaces of the rod lens array.

* * * * *